United States Patent
Martinez et al.

[11] Patent Number: 6,119,229
[45] Date of Patent: *Sep. 12, 2000

[54] VIRTUAL PROPERTY SYSTEM

[75] Inventors: Ronald Martinez, Mill Valley, Calif.;
Bruce Schneier, Minneapolis, Minn.;
Greg Guerin, Tempe, Ariz.

[73] Assignee: The Brodia Group, San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/834,027

[22] Filed: Apr. 11, 1997

[51] Int. Cl.$^7$ ..................................................... G06F 12/14
[52] U.S. Cl. ............................................................ 713/200
[58] Field of Search ............................. 395/200.59, 186, 395/187.01, 188.01; 380/3, 4, 25, 30, 23

[56] References Cited

U.S. PATENT DOCUMENTS

| | | | |
|---|---|---|---|
| 4,899,299 | 2/1990 | MacPhail | 364/570 |
| 5,455,407 | 10/1995 | Rosen . | |
| 5,734,823 | 3/1998 | Saigh et al. | 395/200.59 |
| 5,734,909 | 3/1998 | Bennett | 395/200.59 |
| 5,778,368 | 7/1998 | Hogan et al. | 395/187.01 |
| 5,815,657 | 9/1998 | Williams et al. | 395/186 |
| 5,862,339 | 1/1999 | Bonnaure et al. | 95/200.58 |
| 5,949,876 | 9/1999 | Ginter et al. | 380/4 |
| 5,958,005 | 9/1999 | Thorne et al. | 709/202 |
| 5,960,411 | 9/1999 | Hartman et al. | 705/26 |

FOREIGN PATENT DOCUMENTS

| | | | |
|---|---|---|---|
| 0 753 836 | 1/1997 | European Pat. Off. | G06T 15/00 |
| WO 96 07251 | 3/1996 | WIPO | G06F 17/60 |
| WO 99/24891 | 5/1999 | WIPO . | |
| WO 99/24892 | 5/1999 | WIPO . | |

OTHER PUBLICATIONS

Hofer, R. C. et al: "DIS Today" Proceedings of the IEEE, vol. 83, No. 8, Aug. 1995, pp. 1124–1136, XP000524899.

*Primary Examiner*—Robert W. Beausoliel, Jr.
*Assistant Examiner*—Pierre E. Elisca
*Attorney, Agent, or Firm*—Michael A. Glenn; Kirk Wong

[57] ABSTRACT

A digital object ownership system is disclosed. The system includes a plurality of user terminals, where each terminal is accessible by at least one individual user. The system also includes at least one central computer system that is capable of communicating with each of the user terminals. A plurality of digital objects are provided, where each of the digital objects has a unique object identification code. Each of the digital objects are assigned to an owner. The digital objects are persistent, such that each of the digital objects is accessible by a particular user both when the user's terminal is in communication with the central computer system and also when the user's terminal is not in communication with the central computer system. The digital objects have utility in connection with communication over a network in that the object requires both the presence of the object identification code and proof of ownership.

24 Claims, 9 Drawing Sheets

VIRTUAL PROPERTY SYSTEM

FIELD OF THE INVENTION

The present invention relates to computer networks and, more particularly, to a system of property ownership and transfer implemented in connection with a computer network.

BACKGROUND OF THE INVENTION

In recent years, the use of computer networks for communication and data processing has become increasingly widespread. The increased availability and use of computer networks has created possibilities for new kinds of business and interactions. For example, many people now conduct business transactions, such as banking or retail transactions, over the Internet or private computer networks. Others use the Internet to participate in interactive, multi-party games that could not have existed before the advent of computer networks.

Computer network users generally attempt to exploit the unique features inherent in communications over computer networks. Owners of valuable data or "content," such as software developers or entertainment companies, take advantage of the relative ease and speed of data replication and transmission over computer networks to inexpensively distribute their data to vast audiences. Retailers and advertisers utilize the relative cost-effectiveness and ready searchability (as compared to conventional publishing media) of data published on the World Wide Web to make information available to vast bodies of potential customers. Multinational businesses use the medium to allow immediate and inexpensive communication among employees in various parts of the world.

In each of the above situations, technical challenges must be overcome. Content providers generally seek mechanisms to ensure receipt of payment for any copies of their content which are distributed, and to ensure the integrity of the data transmission. Retailers desire mechanisms for conducting secure commercial transactions over the Internet. Those communicating at a distance often require security and confidentiality of data transmission, and means of authenticating the origin of data received.

These challenges generally are overcome by applying common cryptographic techniques to eliminate data security or privacy concerns, while still allowing users to take advantage of the unique features of the new medium. For example, common cryptographic techniques are available to allow authentication of the sender of a digital message, and to ensure that such a message is opened only by the intended recipient. Data metering systems provide a mechanism for content providers to charge for use of their data. A software provider may also use a conventional "digital signature" to sign code that is being distributed to users, thereby allowing users to rely on the quality of the code received.

In some cases, however, it is desirable to eliminate certain perceived "advantages" or inherent features of the new medium, and extend familiar limitations of the physical world into the electronic realm. In the case of digital cash, for example, it is necessary to prohibit "counterfeiting." This is accomplished by introducing digital equivalents of the security features that protect against counterfeit paper currency.

Traditional features and limitations of ownership and property rights are also sometimes desirable within the computer network environment. In an interactive game environment, for example, users might purchase or otherwise obtain "property" which can be voluntarily or involuntarily transferred to other users. This game "property" may represent a physical item that, in the context of the game, should not be counterfeited or duplicated readily. Thus, for example, the seller of a game object should not be able to retain a usable copy of the sold item.

Previously, there was no adequate, reliable and sufficiently secure system for establishing traditional features of ownership and property rights in the digital realm. Accordingly, there is a need for an improved system of property ownership and transfer that can be implemented in connection with a computer network.

SUMMARY OF THE INVENTION

The present invention involves a system of property ownership and transfer that can be implemented in connection with a computer network.

Certain embodiments of the present invention offer many advantages, including without limitation the following;
  (a) enabling a traditional property rights system in a computer network environment;
  (b) enabling a system of property ownership and transfer in connection with a computer network;
  (c) enabling new types of interactive, multiparty computer games;
  (d) allowing persistent digital property used in connection with a computer network to be transferred offline or online; and,
  (e) establishing mechanisms for tracking ownership of virtual property.

These and many other advantages of certain embodiments of the present invention will become apparent to those skilled in the art from the present patent application.

DETAILED DESCRIPTION OF PREFERRED EMBODIMENT(S)

Overview

Figure 1:
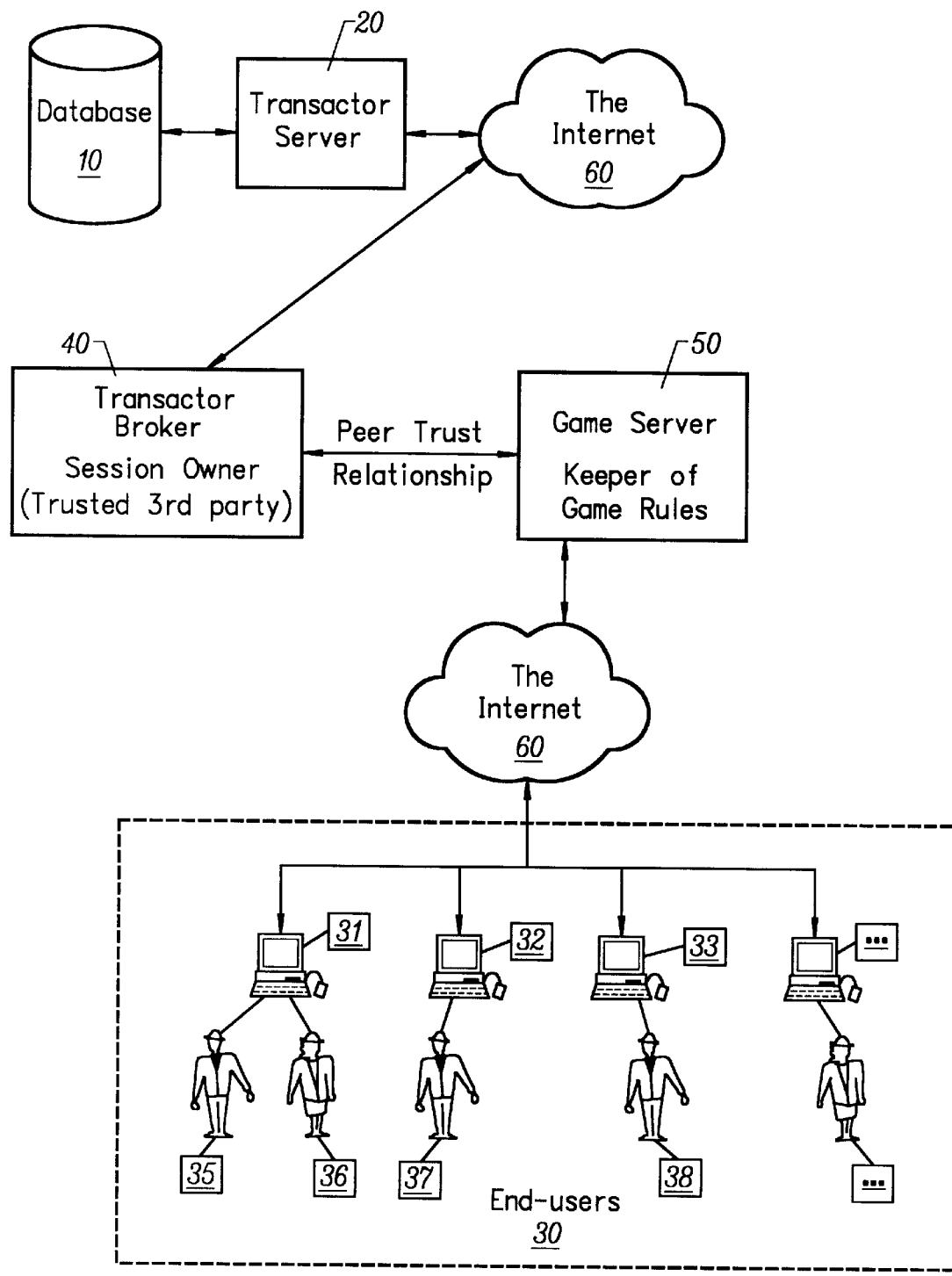
FIG. 1 is an overview of an embodiment of a virtual property system according to the present invention.
Figure 2:
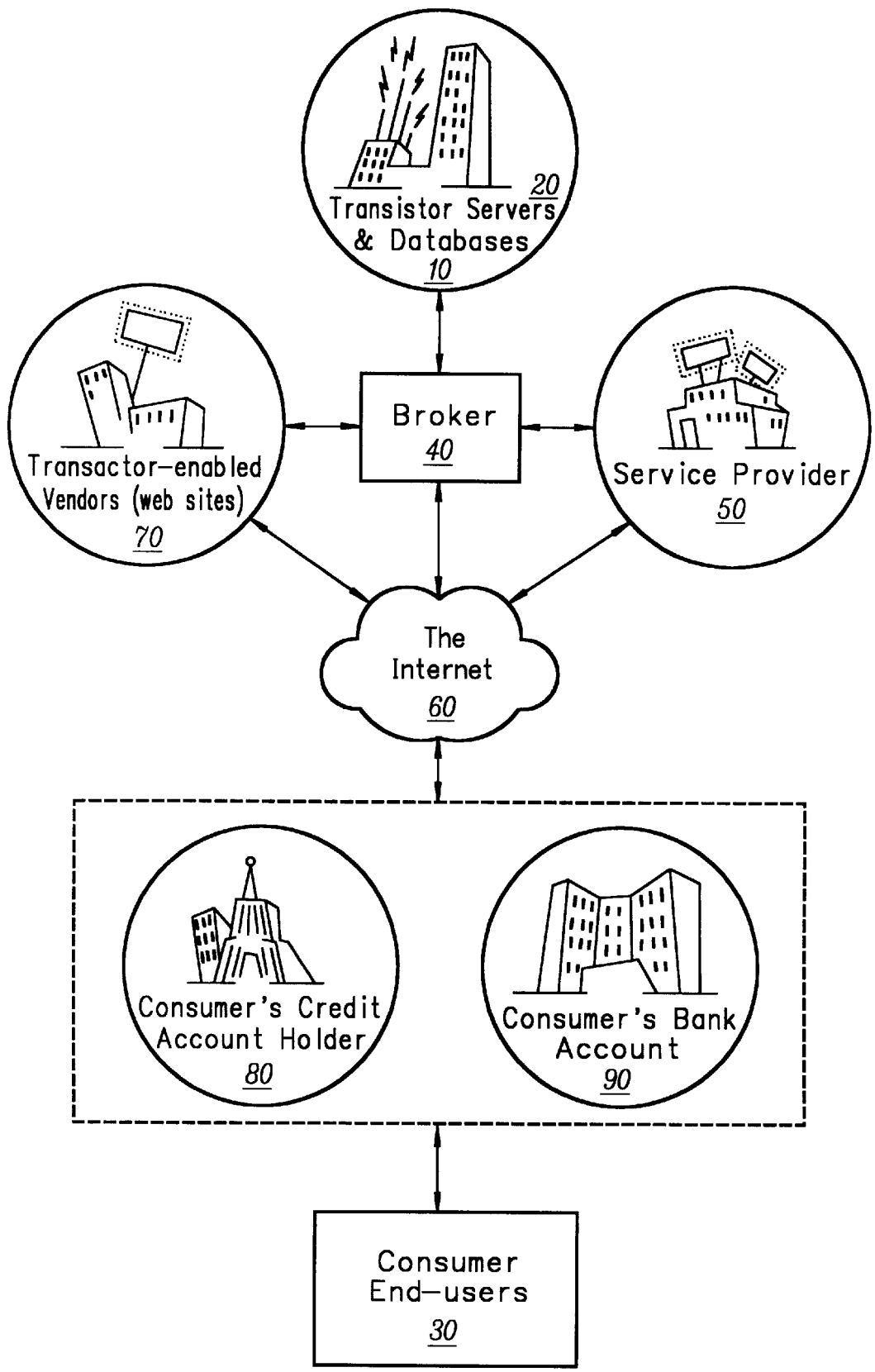
FIG. 2 illustrates the basic relationships among elements of an embodiment of a virtual property system according to the present invention.

A preferred embodiment of a property ownership and transfer system according to the present invention is illustrated in FIG. 1 and FIG. 2 and referred to herein as a "Transactor" system. The illustrated Transactor system involves a database 10, a Transactor server 20, end-users 30, a Transactor broker 40, and an application service provider (e.g., a game server) 50. End users 30 comprise end-user computers (or "terminals") 31, 32, and 33, and end-user individuals 35, 36, 37, and 38.

The illustrated Transactor system may include any number of end-users and/or end-user terminals; an additional terminal and an additional user labeled ". . . " are included in FIG. 1 to illustrate this fact. Database 10 and Transactor server 20 may each comprise a plurality of databases and servers, respectively. Embodiments of the system optionally may include any number of Transactor brokers and application service providers with any number of associated end users.

The application service provider may be a general Internet service provider (e.g., AOL, CompuServe, Pacific Bell), a game specific service provider (e.g., Mpath, Heat, TEN), an open network market-specific service, a closed or private network service, or any other service provided over a computer network. For illustrative purposes only, the below discussion emphasizes the example of a Transactor system in which the application service provider comprises a game server, and the end-users comprise game clients.

End users 30 interact with one another and with game server 50 over a computer network (e.g., the Internet) 60 in a virtual world (e.g., an interactive environment governed by a prescribed set of rules) provided by game server 50 and supported by Transactor server 20. In this virtual world, digital property can be owned by, used, and transferred among end users. End users can also transfer digital property while offline (i.e., not in communication with the game or Transactor servers). Transactor server 20 communicates with Transactor broker 40 over the Internet 60 or, optionally, by a direct communications link.

As illustrated in FIG. 2, other optional participants in the illustrated Transactor system include Transactor-enabled vendors (e.g., web sites) 70, a consumer's credit account holder 80, and a consumer's bank account 90. Transactor-enabled vendors preferably are accessible via the Internet 60, as are consumer's credit account holder 80 and consumer's bank account 90.

The illustrated Transactor entities can be categorized broadly as clients and/or servers. Some entities may act as both a client and a server at the same time, but always as one or the other with regard to other specific entities. For example, a game server acts as a client to a Transactor server, but as a server to its game clients.

The main categories of computing entities in the overall Transactor hierarchy are:

(1) Transactor servers;

(2) Transactor clients;

(3) game servers; and (4) game clients (who are implicitly also Transactor clients).

It should be noted that these computing entities do not necessarily map directly onto individuals, companies, or organizations. An individual, for example, may have more than one Transactor account. Similarly, a game company may set up game servers with more than one Transactor account.

1. Transactor Servers

As described further below, Transactor servers provide transaction and ownership authentication to their clients, who may be other Transactor servers, game servers, game users (which are game clients acting through a game server) and Transactor users (which are not acting through any game server). Transactor servers operate on Transactor user accounts and encapsulated Transactor objects; they need not know the details of any particular game world that may exist.

The Transactor servers essentially define a marketplace in which safe transactions may occur, and existence and ownership may be asserted and verified under rules (i.e., "Transactor Laws of Nature") defined for the Transactor system as a whole. The primary purpose of the Transactor system is to provide a safe marketplace for objects and owners outside the scope of any game in which those objects and owners might participate. If a potential game does not require its game objects to exist outside the scope of its game universe, then using Transactor to determine authenticity and ownership is not necessary. It may, however, be more convenient or easier to use Transactor services than to create a special-purpose property ownership and transfer system for that game.

A given Transactor server is responsible for the objects and users defined in its own database. A Transactor server trusts other Transactor servers for validation of all other objects and users. It can, however, detect certain kinds of cheating that might occur in its conversations with those other Transactor servers.

In some embodiments, a group of Transactor servers have secure access to a shared distributed database. In such embodiments, the group of servers appears, for most purposes, as a single large Transactor server acting on a single database.

2. Transactor Users

Transactor users are users that are in direct communication with a Transactor server, rather than in communication through an intermediary game server. Thus, they are limited to the core Transactor activities of creating objects, making transactions, and authenticating ownership and existence. All other activities are performed through a game server.

3. Game Servers

To a Transactor server, a game server is a Transactor user that performs transactions and limited types of authentications (e.g., verify game membership). Among themselves, however, game servers define, in a conventional manner, a game "universe" or "virtual world" for their clients, and operate on a set of game objects using game rules that the game designer defines for that game. A game universe includes all servers that run the game, the game software's behavior, and the rules that define possible behavior for that game.

4. Game users

Game users are the participants in a game universe that exists on one or more game servers. Preferably, most Transactor operations on the game's owned objects are brokered by the game server, acting on behalf of the game user. In such embodiments, the only time a game user appears as a Transactor user is when object ownership must be authenticated or changed. Even then, however, this activity may be brokered by the game server acting within the scope of the game universe's possible actions.

The components of the illustrated Transactor system, along with their implementation and use, are described in more detail herein. Prior to such description, however, basic operations and transactions in an embodiment of a Transactor system are described.

Scenario Examples

This section describes various uses of a Transactor system in the form of exemplary "scenarios," which are illustrated in FIGS. 3, 4, 5, 6, and 7. A scenario is an exemplary use of Transactor technology to accomplish some purpose for a user. A user may be a consumer, a vendor, or any other user of the Transactor technology, including an intermediate server program that subscribes to Internet-based Transactor services; for convenience, the user is referred to consistently in these scenarios as a consumer.

The illustrated scenarios are representative examples only. Other scenarios and their implementation will be apparent to those of ordinary skill in the art based on the present disclosure. The scenarios refer to the elements of the Transactor system illustrated in FIGS. 1 and 2, along with certain details and components described further herein.

Figure 3:
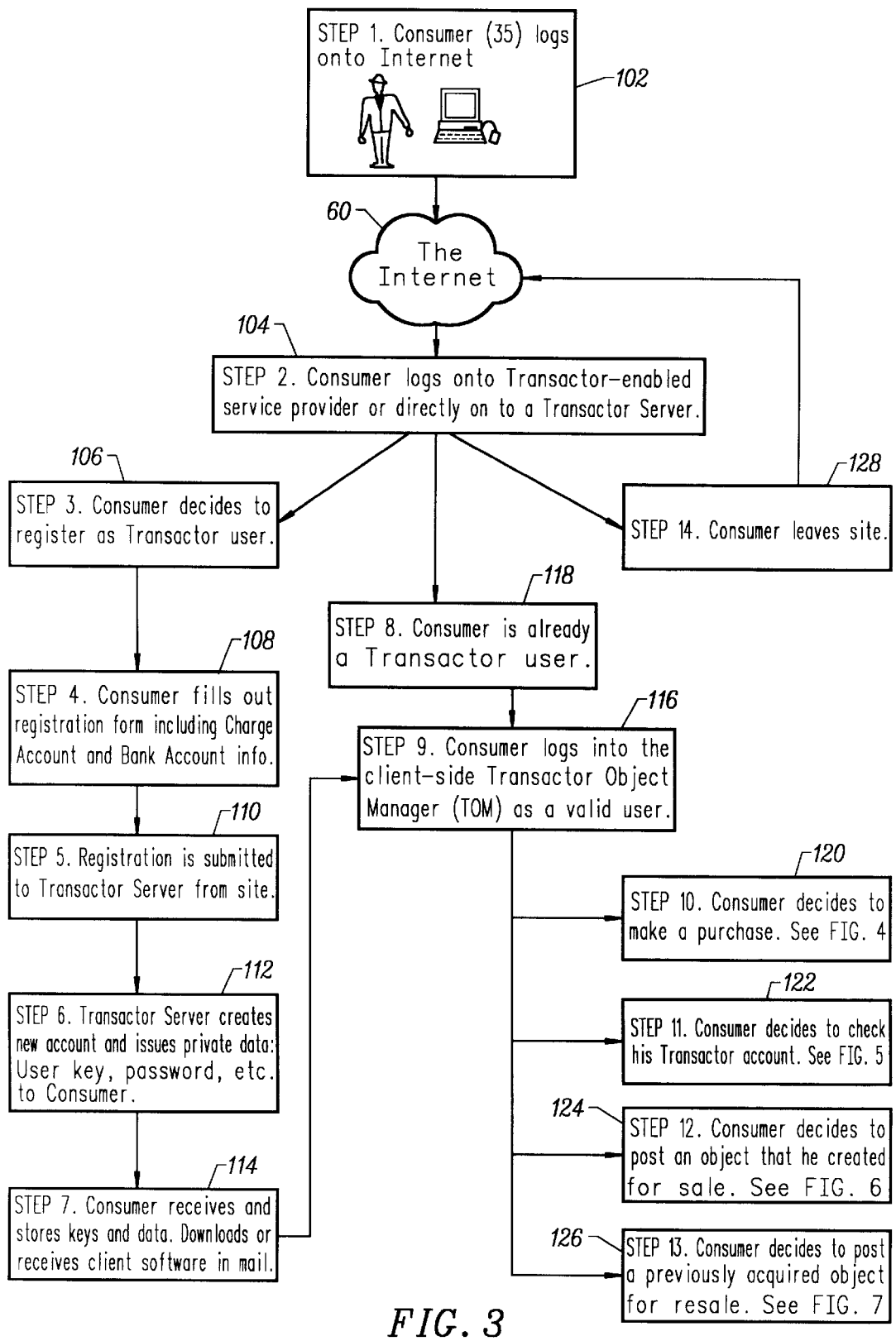
FIG. 3 illustrates a consumer login scenario used in connection with an embodiment of a virtual property system according to the present invention.

The Login Scenario (FIG. 3)

FIG. 3 describes a process in which a user logs on, and optionally registers as a Transactor user, in an exemplary embodiment of a Transactor system. As illustrated in FIG. 3, the following steps take place:

In step 1 (illustrated at 102), the consumer (e.g., user 35) logs onto the Internet 60.

In step 2 (at 104), the consumer logs onto a Transactor enabled service provider (or onto a Transactor server).

At this point, there are several possibilities. The consumer may decide to register as a Transactor user (step 3, at 106). Alternatively, the consumer may decide not to register as a Transactor user and, consequently, leave the site (step 14, at 128). Alternatively, the consumer may already be a registered Transactor user (step 8, at 118) and have no need to register as a Transactor user.

Assuming the consumer decides to register as a Transactor user, the consumer fills out a registration form (step 4, at 108), identifying his or her charge account and bank account information. When the consumer has entered the requested information, the information is submitted to a Transactor server (step 5, at 110). The Transactor server creates a new account and issues private data (e.g., user key, password) to the consumer (step 6, at 112). The consumer receives and stores the keys and other data, and obtains the Transactor client software (e.g., by download or mail) (step 7, at 114).

After the consumer has become a registered Transactor user (after completing step 7 or step 8), the consumer logs into the client-side Transactor object manager (which is described further herein and abbreviated "TOM") as a valid user (step 9, at 116).

After logging in as a valid user, the consumer has a variety of options. The consumer may decide (Step 10) to make a purchase (illustrated at 120 and in FIG. 4). The consumer may decide (step 11) to check his Transactor account (illustrated at 122 and in FIG. 5). The consumer may decide (step 12) to post an object that he has created for sale (illustrated at 124 and in FIG. 6). The consumer may decide (step 13) to post a previously acquired object for resale (illustrated at 126 and in FIG. 7).

Figure 4:
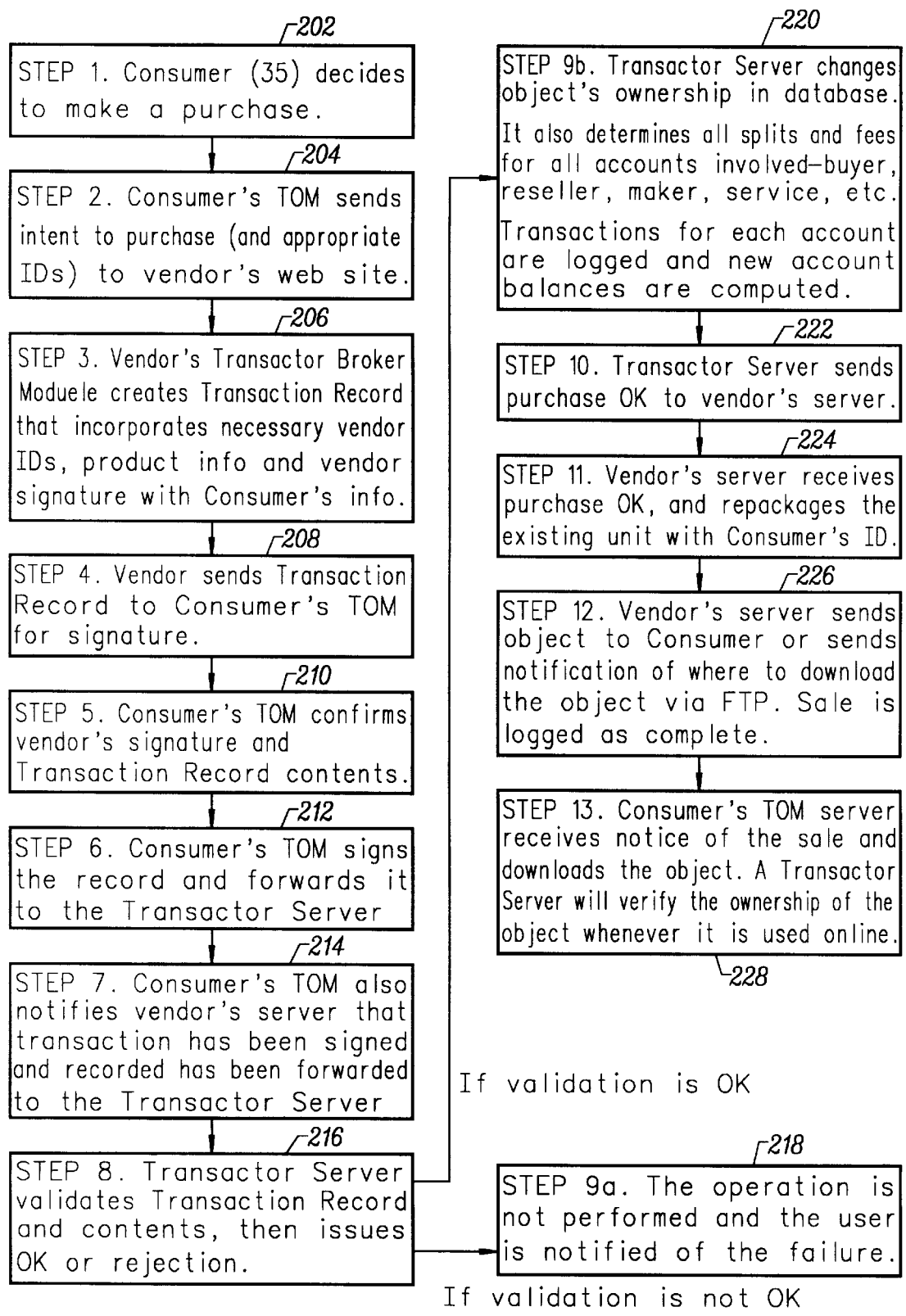
FIG. 4 illustrates a web purchase scenario used in connection with an embodiment of a virtual property system according to the present invention.

The Consumer Web-Purchase Scenario (FIG. 4)

FIG. 4 describes the process in which a user makes a simple purchase from a web sales site and uses the new object on the network in an exemplary embodiment of a Transactor system. As illustrated in FIG. 4, the following steps take place:

In step 1 (at 202), a consumer (e.g., user 35) decides to make a purchase. The consumer's TOM sends (step 2, at 204) signals indicating an intent to purchase, along with the appropriate user ID and product information, to the vendor's web site. The vendor's Transactor broker module creates (step 3, at 206) a transaction record that incorporates necessary vendor IDs, product information and vendor signatures with consumer's information.

The vendor then sends (step 4, at 208) a transaction record, as described further herein, to the Consumer's TOM for signature. The consumer's TOM confirms (step 5, at 210) the vendor's signature and transaction record contents, and signs and forwards (step 6, at 212) the transaction record to the Transactor server. The consumer's TOM also notifies (step 7, at 214) the vendor's server that the transaction has been signed and a record has been forwarded to the Transactor server.

The Transactor server then validates (step 8, at 216) the Transaction record and contents, issuing an OK (i.e., transaction is valid) or a rejection (transaction is invalid). If the validation is not OK, the operation is not performed and the user is so notified (step 9a, at 218). If the validation is OK, the Transactor changes (step 9b, at 220) the object's ownership in the relevant database and determines all splits and fees for all accounts involved (e.g., buyer, reseller, maker, service provider); transactions for each account are then logged and new account balances are computed.

The Transactor server then sends (step 10, at 222) a purchase OK to the vendor's server, and the vendor's server receives (step 11, at 224) the OK and repackages the existing unit with the consumer's ID.

The vendor's server then sends (step 12, at 226) the object to the consumer or sends notification of where to download the object via FTP. The sale is logged as complete.

Finally, the consumer's TOM server receives (step 13, at 228) notice of the sale and downloads the object according to the instructions received in step 12. When the object is subsequently used online, a Transactor server will verify the ownership of the object.

Figure 5:
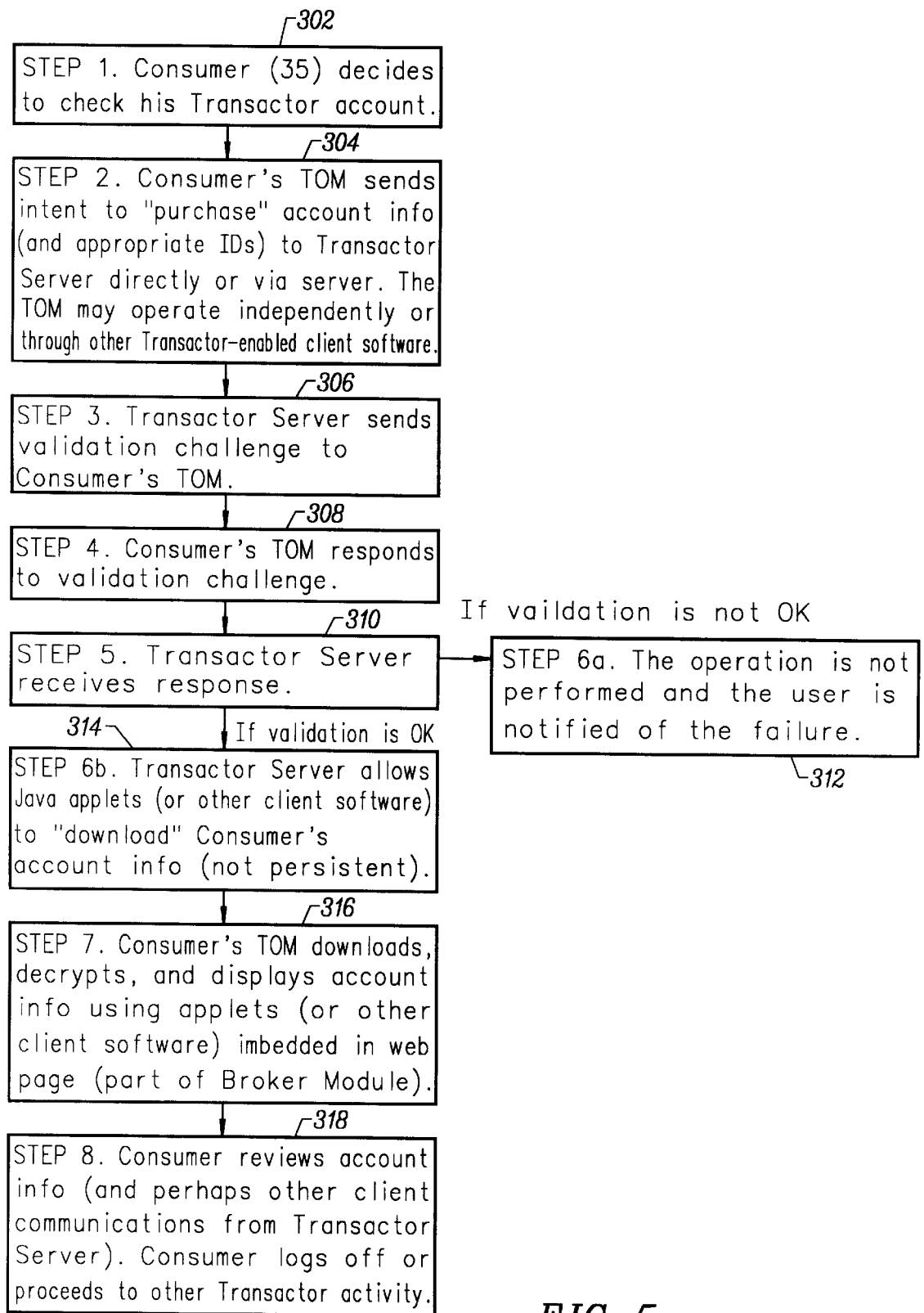
FIG. 5 illustrates an account checking procedure used in connection with an embodiment of a virtual property system according to the present invention.

The Consumer Account-Check Scenario (FIG. 5)

FIG. 5 describes the process in which a consumer checks his Transactor account. As illustrated in FIG. 5, the following steps take place:

In step 1 (at 302), a consumer (e.g., user 35) decides to check his Transactor account.

The consumer's TOM sends (step 2, at 304) intent-to-purchase account information (with appropriate user IDs) to the Transactor Server, either directly or via a Transactor enabled web site or broker server. The TOM may operate independently or through other Transactor enabled client software. The Transactor server then sends (step 3, at 306) a validation challenge to the consumer's TOM, and the consumer's TOM responds (step 4, at 308) to the validation challenge. The Transactor server receives the response (step 5, at 310).

If the validation is not OK, the operation is not performed and the user is notified of the failure (step 6a, at 312).

If the validation is OK, the Transactor server allows (step 6b, at 314) the client software (e.g. Java applets) to download the consumer's account information (not persistent). The consumer's TOM downloads (step 7, at 316), decrypts and displays account information using applets (or other client software) embedded in the web page (part of broker module, described herein).

The consumer then reviews (step 8, at 318) account information (along with other communications from the Transactor server, if any have been received) and logs off or proceeds to other Transactor activity.

Figure 6:
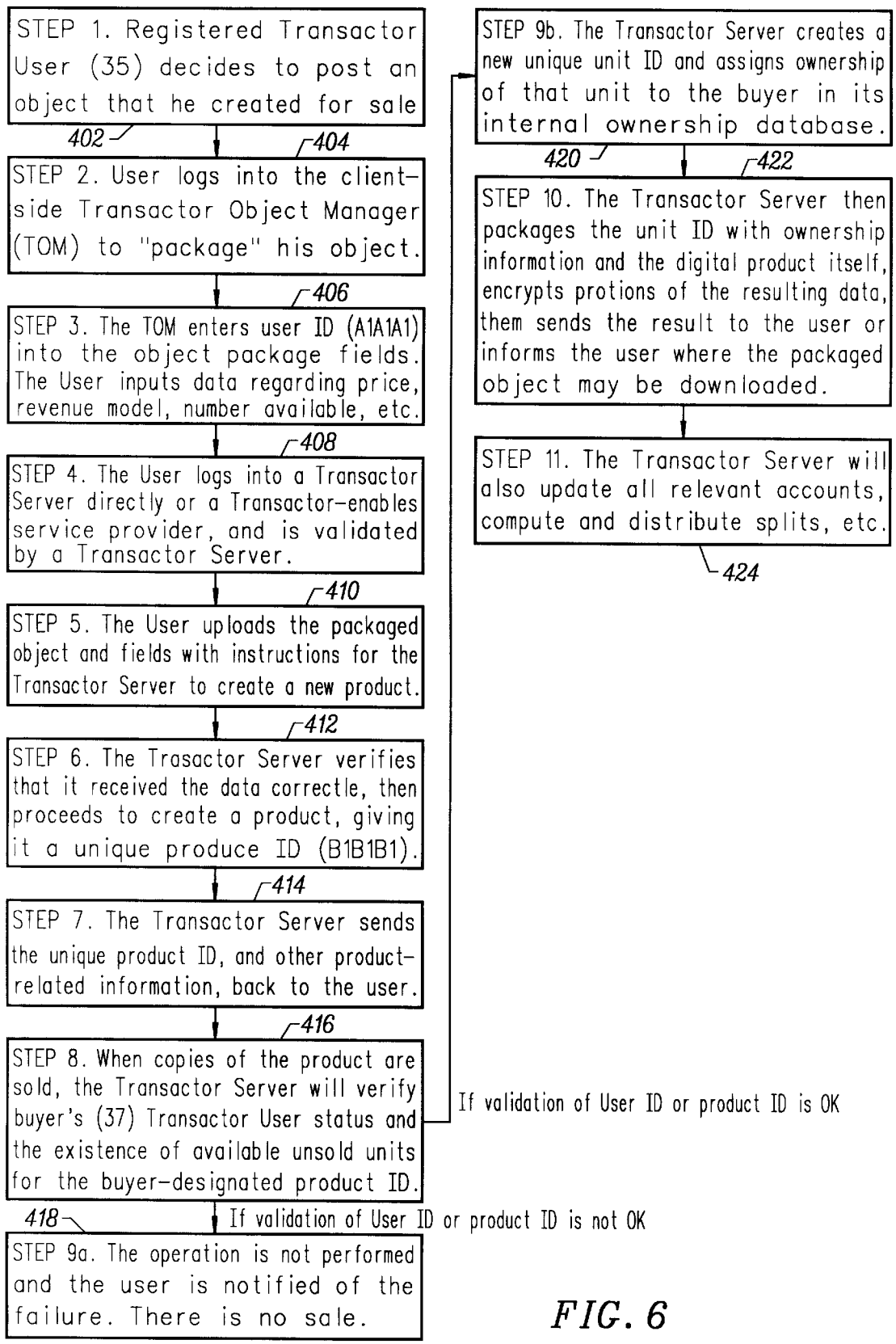
FIG. 6 illustrates a procedure for posting a newly created object for sale in connection with an embodiment of a virtual property system according to the present invention.

The Sale of Created Object Scenario (FIG. 6)

FIG. 6 describes the process in which a registered Transactor user posts an object that he created for sale. As illustrated in FIG. 6, the following steps take place:

In step 1 (at 402), a registered Transactor user (e.g., user 35) decides to post an object that he has created for sale. The user the (step 2, at 404) logs into the TOM to "package" his object, the TOM enters (step 3, at 406) the user ID (e.g., A1A1A1) into the object package fields, and the user inputs data regarding, for example, price, revenue model, and number available.

The user logs on (step 4, at 408) to a Transactor Server directly or a Transactor-enabled service provider, and is validated by a Transactor Server. The user then uploads (step 5, at 410) the packaged object and fields with instructions for the Transactor Server to create a new product.

The Transactor Server then verifies (step 6, at 412) that it received the data correctly, and proceeds to create a product, giving it a unique product ID (B1B1B1). The Transactor Server then sends (step 7, at 414) the unique product ID, and other product-related information, back to the user.

When copies of the product are sold, the Transactor Server will verify (step 8, at 416) buyer's (37) Transactor User status and the existence of available unsold units for the buyer-designated product ID.

If the validation of user ID or product ID is not OK, the operation is not performed and the user is so notified (step 9, at 418).

If the user ID and product ID are OK (step 9b, at 420) to produce a new unit of the product, the Transactor Server creates a new unique unit ID and assigns ownership of that unit to the buyer in its internal ownership databases. The Transactor Server then packages (step 10, at 422) the unit ID with ownership information and the digital product itself, encrypts portions of the resulting data, and sends the result to the user or informs the user where the packaged object may be downloaded. The Transactor Server also updates (step 11, at 424) all relevant accounts, computes and distributes splits.

Figure 7:
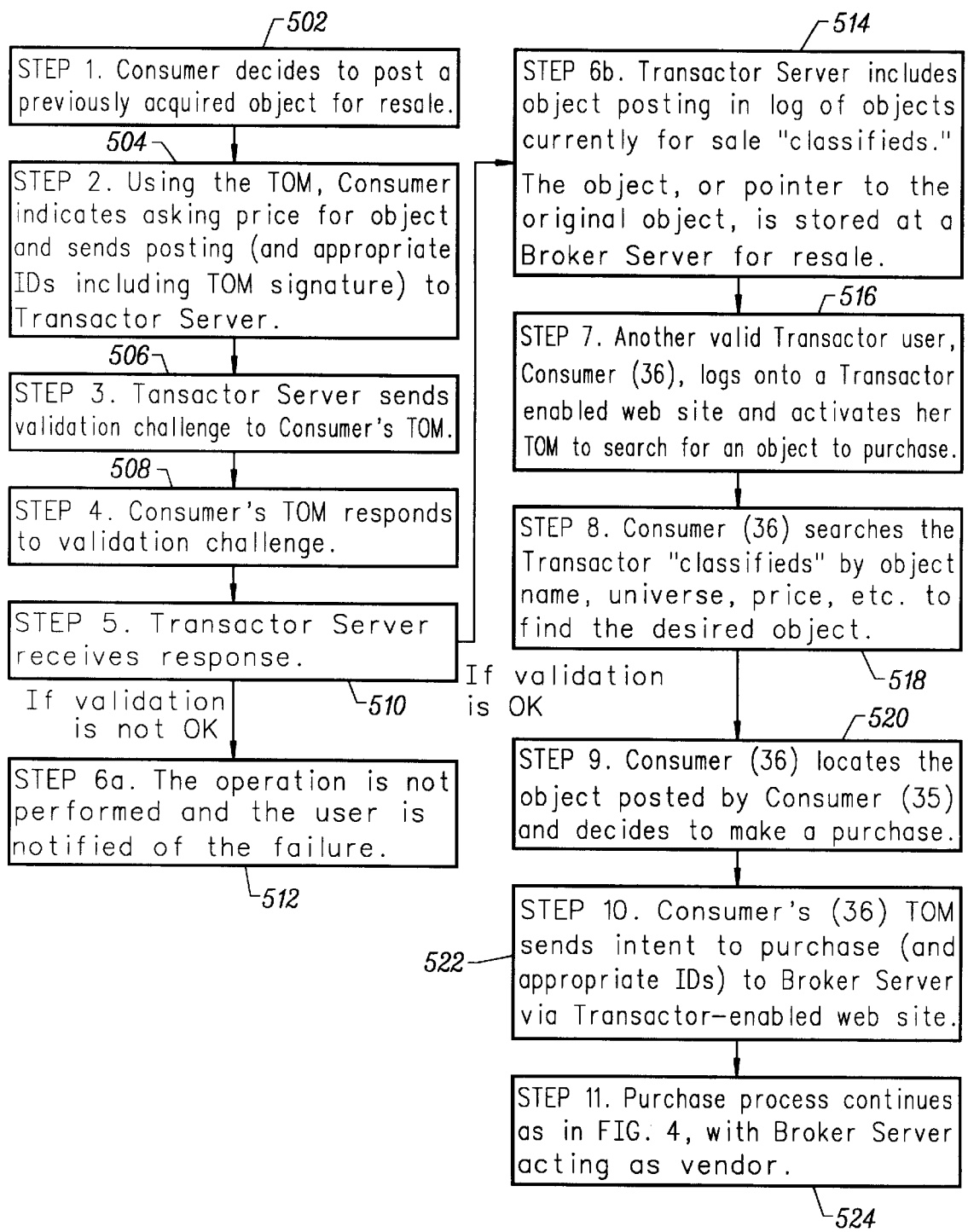
FIG. 7 illustrates a procedure for posting a previously acquired object for resale in connection with an embodiment of a virtual property system according to the present invention.

The Sale of Previously Acquired Object Scenario (FIG. 7).

FIG. 7 describes the process in which a registered Transactor user posts a previously acquired object for sale. As illustrated in FIG. 7, the following steps take place:

In step 1 (at 502), the Consumer decides to post a previously acquired object for resale. Using the TOM, the Consumer then indicates (step 2, at 504) the asking price for the object and sends posting (and appropriate IDs including TOM signature) to the Transactor Server.

The Transactor Server then sends (step 3, at 506) a validation challenge to the Consumer's TOM. The Consumer's TOM responds (step 4, at 508) to the validation challenge. The Transactor Server receives (step 5, at 510) the response.

If the validation is not OK, the operation is not performed and the user is so notified (step 6a, at 512).

If the validation is OK, the Transactor Server includes (step 6b, at 514) the object posting in a log of objects currently for sale "classifieds." The object, or a pointer to the object, is stored at a Broker Server for resale.

Another valid Transactor user, for example Consumer 36, logs on (step 7, at 516) to a Transactor enabled web site and activates her TOM to search for an object to purchase.

Consumer 36 searches (step 8, at 518) the Transactor "classifieds" by object name, universe, price, or any other conventional search criteria to find the desired object.

Consumer 36 then locates (step 9, at 520) the object posted by Consumer 35 and decides to make a purchase. The TOM for Consumer 36 then sends (step 10, at 522) its intent to purchase (and appropriate IDs) to the Broker Server via the Transactor-enabled web site. The purchase process continues (step 11, at 524) as in FIG. 4, with the Broker Server acting as vendor.

Limited Edition Digital Object

The Transactor system allows for the ownership and sale of limited edition digital objects. An exemplary limited edition digital object (a "LEDO") 600 is illustrated in FIG. 8.

Figure 8:
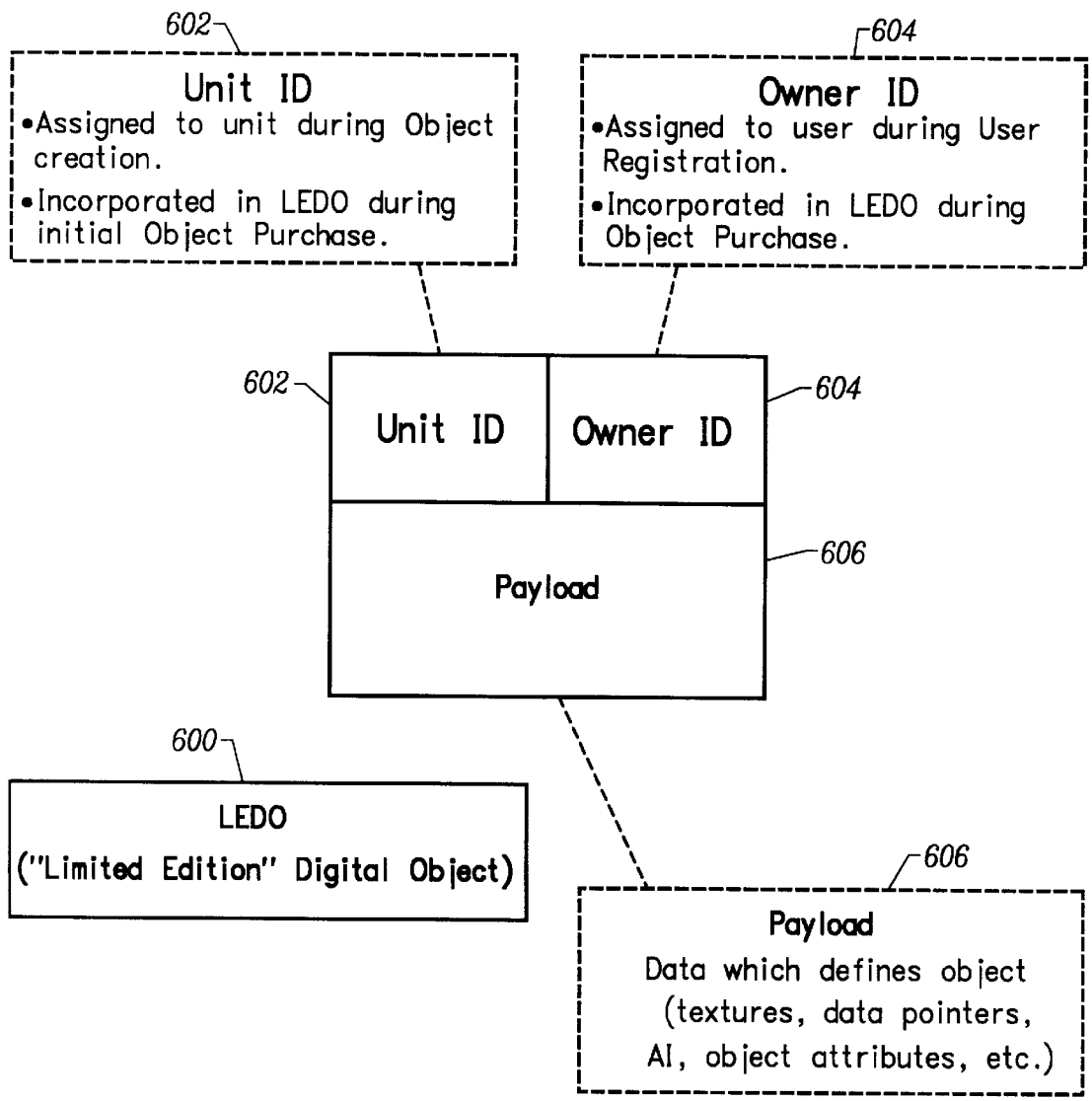
FIG. 8 illustrates the structure of a limited edition digital object used in connection with an embodiment of a virtual property system according to the present invention.

As shown in FIG. 8, LEDO 600 comprises a payload 606, a unit ID 602, and an owner ID 604. Each of these elements are illustrated in corresponding dashed boxes. Examples of LEDOs for use in game environment in connection with an embodiment of a Transactor system comprise tools, characters, keys, spells, levels, abilities, behaviours. A variety of additional types of LEDOs for use with embodiments of a Transactor system will be apparent to those skilled in the art from the present disclosure. In this example, each LEDO has a unique, immutable unit ID, an owner ID indicating the current owner of the object and a payload comprising binary data which defines the object characteristics.

Unit ID 602 is assigned to the unit during object creation and incorporated in the LEDO during the initial object purchase. The owner ID 604 is assigned to the user during User Registration and incorporated in the LEDO during object purchase. Payload 606 comprises data which defines the object (e.g., textures, data pointers, AI, object attributes). In preferred embodiments, the objects are persistent such that they are accessible both when the user is in communication with a server (e.g., a game server) and when the user is not in communication with the server.

The number of LEDOs of a particular type can be closed or limited (e.g., the product run is capped at a predetermined number) or open-ended. The unit ID for each LEDO is assigned at its creation and is unique. The unit ID is immutable in the sense that a change in the unit ID for a particular LEDO can be detected and, in preferred embodiments, the LEDO loses functionality (e.g., it cannot be used in the relevant game world) if it has been altered.

Figure 9:
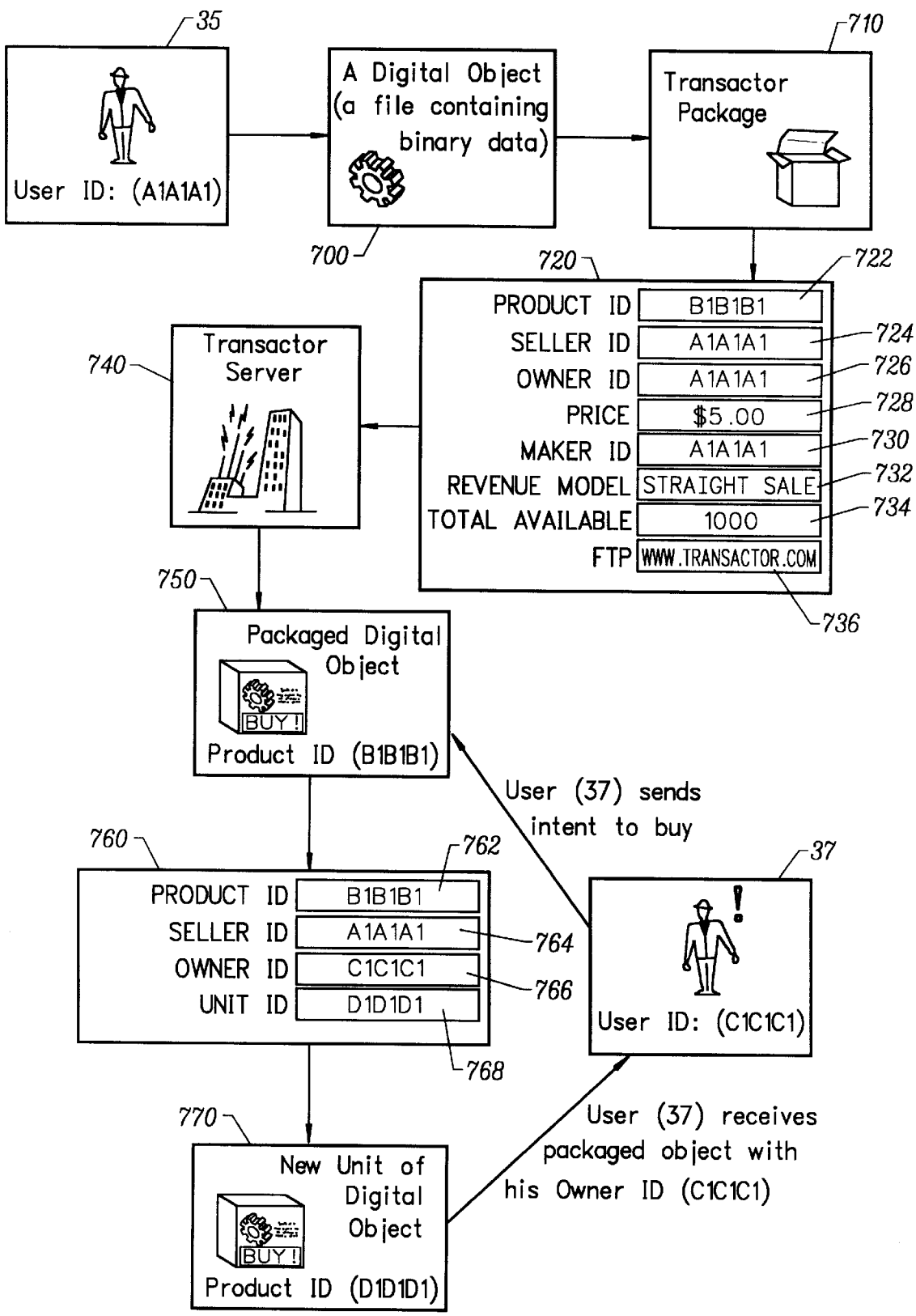
FIG. 9 illustrates aspects of a procedure according to FIG. 6.

Additional Aspects of the Sale of Created Object Scenario (FIG. 9)

FIG. 9 describes the process in which a registered Transactor user posts an object that he has created for sale in accordance with the previous description in FIG. 6. The following description of the steps in this process uses the FIG. 6 reference numerals and step numbers, along with the FIG. 9 reference numerals:

In step 1 (at 402), a registered Transactor user (e.g., user 35) decides to post an object that he has created for sale. The user the (step 2, at 404) logs into the TOM to "package" his object, the TOM enters (step 3, at 406) the user ID (e.g., A1A1A1) into the object package fields, and the user inputs data regarding, for example, price, revenue model, and number available.

The user logs on (step 4, at 408) to a Transactor Server directly or a Transactor-enabled service provider, and is validated by a Transactor Server.

Steps 1 through 4 above are further illustrated in FIG. 9 by User 35 (identified by code A1A1A1), digital object 700 (e.g. a file containing binary data), transactor package 710 which wraps the object as described herein, and data fields 720. Data fields 720 include a product ID field 722 for the identification code associated with the object (in this case, B1B1B1), a seller ID field 724 for entering an identification code associated with the seller of the object (in this case, A1A1A1), an owner ID field 726 for entering an identification code associated with the owner of the object (in this case, A1A1A1), a price field 728 for entering the requested price for the object (in this case, $5.00), a maker ID field 730 for indicating the identity of the maker of the object (in this case, A1A1A1, the owner), a revenue model field 732 to indicate financial terms associated with the sale of the object (in this case, a straight sale), a total available field 734 indicating the total number of objects of this type that are available for sale, and an FTP field 736 indicating the delivery details for the object. In this case, for example, the field shows a URL for a web site from which the buyer can download his purchased object. The object is encrypted so that it can only be "unpacked" (opened) by the buyer.

The user then uploads (step 5, at 410) the packaged object and fields with instructions for the Transactor Server (illustrated at 740) to create a new product.

The Transactor Server (740) then verifies (step 6, at 412) that it received the data correctly, and proceeds to create a product (illustrated at 750), giving it a unique product ID (B1B1B1) shown in data field 762. The Transactor Server then sends (step 7, at 414) the unique product ID, and other product-related information, back to the user.

When copies of the product are sold, the Transactor Server will verify (step 8, at 416) buyer's (in this case, user 37) Transactor User status and the existence of available unsold units for the buyer-designated product ID.

If the validation of user ID or product ID is not OK, the operation is not performed and the user is so notified (step 9, at 418).

If the user ID and product ID are OK (step 9b, at 420) to produce a new unit of the product, the Transactor Server creates a new unique unit ID (illustrated at data field 768 and, in this case, D1D1D1) and assigns ownership of that unit from the seller (A1A1A1, illustrated in data field 764) to the buyer (C1C1C1 illustrated in data field 766) in its internal ownership databases and in the new object (relevant data is illustrated in data fields 760). The Transactor Server then packages (step 10, at 422; also illustrated at 770) the unit ID with ownership information and the digital product itself, encrypts portions of the resulting data, and sends the result to the user or informs the user where the packaged object (illustrated at 770) may be downloaded. The Transactor Server also updates (step 11, at 424) all relevant accounts, computes and distributes splits.

Trust Relationships

The illustrated Transactor system is predicated upon various trust relationships among the Transactor entities illustrated in FIGS. 1 and 2. These trust relationships are as follows:

1. Transactor Servers

A Transactor Server trusts other Transactor Servers to correctly authenticate objects and accounts which are outside its own knowledge. This trust is mutual.

A Transactor Server does not trust a Transactor User. Accordingly, a Transactor Server does not trust a game Server. All transactions and authentication must be valid according to the Transactor protocol rules, or a transaction request will be rejected. Both participants in any transaction are independently authenticated by the Transactor Server.

2. Transactor Users

A Transactor User trusts all Transactor Servers to give correct information about transactions, objects, and accounts.

A Transactor User does not trust another Transactor User, except to the extent authenticated by a Transactor Server.

3. Game Servers

Game Servers, like other Transactor Users, trust their Transactor Servers to perform valid ownership transfers, and to correctly authenticate user-accounts and object ownership. Game Servers also trust the Transactor Server to authenticate game objects themselves (i.e., detect data tampering), but only insofar as the originally registered game object was itself correct in the game universe. That is, if the originally registered game object was flawed or illegal for the game universe, it will be "correct" as far as the Transactor Server is concerned, but will be "incorrect" when the game server tries to use it.

Game servers need not trust their game users. In some embodiments, however, game servers may trust game users without a Transactor server authentication.

Game servers trust other game servers that help create the game universe.

4. Game Users

Game users trust game servers to "play a fair game" (i.e., follow the rules of the game universe). Game servers that do not play a fair game are unlikely to be successful in the game market, but there is no final Transactor arbiter of what constitutes a "fair game."

A game user need not trust another game user, except insofar as confirmed by the game server for the given game universe.

Transactor Brokering

This section includes a description of how, in an embodiment of a Transactor system according to the present invention, objects may be bought, sold, and traded using a mutually trusted third party (a broker) in order to effect transactions in other than real-time. For illustrative purposes, this is described in terms of a "game," the rules of which define a model of conventional real-world brokering and agency. A typical problem involving a game, game-players, and ownership transfer is first presented. This example is followed by a brief analysis of a "simple solution," which can be used in simple embodiments of a Transactor system. Finally, there is a discussion of brokers, their actions, rules, and how this solves the basic ownership-transfer problem when implemented in more complex embodiments of a Transactor system.

1. An Exemplary Game Scenario and Implementation Problem

This example involves a simple multi-player game, running on a server machine. The players own some Transactor objects, which reside on their own machines. A few players decide to play a game using some (but not all) of their owned objects, using the game server to run the "game world."

The rules of this game allow game objects (encapsulated as Transactor objects and initially existing on the player's machines) to be involuntarily "plundered" by the brute force or trickery of any player, as well as voluntarily traded away, or simply lost or dropped. In this game, possession equals ownership. Lost or dropped objects not picked up by another player are "owned" by the game (or game service provider). A Transactor server is contacted and a transaction (a Transactor ownership transfer) made each time a game-object changes ownership, (e.g., it is plundered, traded away, lost, dropped).

To begin playing the game, users upload (or otherwise identify) their objects to the game server, which authenticates ownership and validity with the Transactor server. During play, an object changes hands, so an ownership transfer occurs, and the Transactor server is again contacted, with all the overhead such an ownership change entails. Each transaction also requires the owner's client machine to participate, since that is where the user's digital keys, required for ownership transfer, reside.

The basic problem is how a game server or anyone else in the above scenario can truly enforce transferring ownership involuntarily; that is, without the active assent of the object's original owner. Under ordinary circumstances, the owner cannot be compelled to use or disclose his private key and, without it, ownership cannot be taken away. Even if the game-client software running on the player's machine automatically responded to a game server request to transfer ownership, the user could have hacked the software to not permit ownership transfers. Thus, in conventional circumstances, the game server would have no way to enforce ownership transfer to the object's new owner.

One conceivable solution might be to have the game server certify to the Transactor server that a new player is the actual owner, and to somehow confirm that it really is the game server requesting this. This approach appears simple, but would require greater underlying complexity in the overall Transactor system. There would then be two kinds of transactions: a voluntary kind where both participants willingly state that a transaction should occur (normal sale or trade), and one where a third participant (the game server) says that a transaction should occur, even if the owner doesn't agree. This arrangement would also require that Transactor servers trust all game servers, thus opening up potential holes in the overall system security model and greatly expanding the required trust relationships in the overall system. It would also require that Transactor servers distinguish a game-server account from other kinds of accounts, and treat them differently.

In a large game with a persistent universe, this apparent solution would force the Transactor servers to process huge numbers of transactions (one for every trade, steal, plunder, or take), and require that the game servers certify that each involuntary trade was legal (to guard against fraud or hacking). All this network traffic must occur in real-time, or at least with an asynchronous capability. But that asynchronicity can propagate to any depth, since objects may rapidly change owners again before a prior ownership transfer has completed. This quickly leads to a large "roll-back" problem that a game server must handle on its own.

2. The "Simple" Solution

In some embodiments, to solve the above-described problem, a game player gives a "power of attorney" privilege to a game server during game play, and rescinds it when the game ends or the player withdraws from play. Under these "powers of attorney," the game server takes ownership of every object brought into play, keeping track of the "true" owner. The game server then runs the game according to its rules for who owns what and how they got it, and finally resolves end-game ownership by transferring the objects to their most recent game-level owners.

During game play, the game server must tag each object with it's current "designated owner," starting with the ID of the original owner. The game server still owns the object, as far as the Transactor system is concerned, so the designated owner is just a part of how the game is played. The tag is simply the Transactor user-ID of whoever has game-level ownership of the object. Plundered objects are tagged with the user-ID of the plunderer. Objects traded voluntarily are tagged with the new owner's ID. Lost or dropped objects are tagged with the Transactor user-ID of the game itself (i.e. the game service provider's ID). When a player withdraws and takes his objects out of play, the game server (which owns all in-play objects) transfers actual Transactor-level ownership to the player. If a player's connection goes out, the game server maintains the "designated owner" tags, subject to plundering by other players within the game context.

This arrangement requires only that game players trust the game server, which is already required as described above. No additional trust is required between game servers and Transactor servers. All transactions still involve only two equal parties. The Transactor server need not distinguish between game-server ID's and ordinary-user ID's, nor treat any user in a special way.

One downside to this arrangement is that, if a game is played and no objects change "true" owners, there is an initial ownership transfer from the players to the game server, plus a closing transfer back to the original owner. In embodiments employing this "simple solution," there is no way to avoid this, because without it the game server has no enforceable authority to transfer objects that are in play. Fortunately, this activity is largely confined to game startings and endings.

These "power-of-attorney" transfers can occur asynchronously at the beginning of the game, but players will probably want them to occur synchronously at game-end. Mid-game "cash-outs" that remove objects from play (assuming the game rules allow this) can be performed asynchronously, to minimize impact on game play. In some embodiments, servers spawn sub-processes or call on concurrent server-side programs to perform cash-outs synchronously, rather than burdening the game-program with such non-game details.

In some embodiments, a game server provides "free parking" to game players who want to keep their objects on the server and avoid most uploading and downloading. The server retains ownership of the objects, but they are not active in any game. These "parked objects" are not available to the player for out-of-game trading, but can be reacquired by the player at any time 3. Brokers and Brokering The term broker in this description refers to any mutually trusted third party who acts on behalf of two other parties to effect some pre-determined action. A broker is trusted to act on behalf of the original authority, but only within the boundaries defined at the time of the brokering agreement, and only for specific designated objects. In order to actually complete a transaction, both participants in the brokered transaction must trust the brokering agent to act on their behalf. Thus, a broker is a mutually trusted intermediary in a transaction that occurs between two other individuals, neither one of whom need trust the other.

As described below, a Transactor Server provides a means by which an individual may grant trust to another individual in the Transactor system. This will become clear from the following description of a "brokering game."

In a "Brokering Game," a broker is an agent. Its actions result in a safe trustworthy transaction between two other parties, who are the "players" in the Brokering Game.

A broker operates on an object, acting as intermediary in transferring ownership between the original owner and the buyer. Users (players) in the Brokering Game participate voluntarily, and willingly transfer ownership of their objects to the broker with the understanding that they will get them back if the broker does not sell the object.

The Game Universe of the Brokering Game consists of all the objects that a given broker has for sale or trade, and the identity of each object's original owner (the "designated owner"). The Brokering Universe may also contain requests by players for the broker to seek out and obtain a certain kind or class of object. These requests would require a more sophisticated Brokering Game program.

There may be any number of different Brokering Game Universes running at once, on any number of different servers from different providers. They need not communicate with one another directly, since each is only responsible for its own objects and players (users).

Any particular instance of the Brokering Game may charge a fee to "play". That is, it may charge a fee in order to broker a transaction. This fee is different from the Maker's Fee computed by the Transactor Server. Fees are defined by whoever creates a particular Brokering Game.

Brokers are typically connected through the Internet to a number of other brokers (although they need not be). These brokers may communicate requests to one another in order to complete transactions. These inter-broker communication protocols are yet to be defined, but must be standardized for all brokers.

Brokers that do not communicate directly with other brokers behave as simple public or private store-fronts for the sale of their users' objects (sort of a "consignment store"). This may entail a web connection (HTTP server) in addition to the brokering services, or it may be a "closed game" in which only registered users can log on and participate. That is a decision to be made by the game designer. It is not a Transactor rule or law.

The basic rules of the Brokering Game, or of any other game which acts as a broker for its users, are as follows:

(1) All objects actively being brokered must first have their Transactor-ownership transferred to the broker itself. This confers the power to sell the object on the brokering agent and have the ownership transferred to the buyer immediately, without requiring the original owner to participate directly or in real-time.

(2) The broker can own objects that are not actively being brokered because one or more criteria of the brokering agreement have lapsed. For example, an agreement may place an end-date beyond which the object cannot be sold. Since the user will probably not be logged in at that exact moment, the broker must immediately take the object out of active brokering "play", and hold it in "parking" or "escrow" until the user reclaims the object. The broker can't simply email the object back to the owner, because the owner's keys are required for the ownership transfer.

(3) Players must trust the broker to return unsold objects on demand, or according to some predetermined criteria, such as after an expiration date. This requires that the broker keep a record of the original owner, along with all necessary relevant Transactor information about the owner, and the criteria of the brokering agreement. The broker must return these objects as requested by the original owner, as authenticated by a Transactor Server.

(4) Brokers must notify the original owner with all due haste when an object has been sold. This is more than just a courtesy to players, since the original owner may be a game server that requires some real-time notification of a sales transaction in order to run its game in something approaching real time.

Brokers should also notify the original owner when one of the limiting criteria of the brokering agreements lapses, when the brokering agreement itself expires, or some other criterion takes the object out of active brokering "play."

The basic rules of brokering given above define a fundamental set of ground rules by which brokers act for users. But they are not limited just to game servers that only play the Brokering Game. If any game implements these rules using a game-as-broker design, it can act as a broker on behalf of all its users, for whatever purpose the game designers choose. One important such purpose is to implement "plundering" (also called "stealing") and borrowing within a Game Universe.

Plundering is a game rule that allows a game user to gain ownership of a Transactor object simply by taking it (possession equals ownership). Normally Transactor objects are useless to those who would simply take them (i.e. copy the file), because the object itself is encrypted under the owner's key, and because a Transactor server would disallow the object's use except by the owner. If, however, a game universe acts as a broker, then it owns all objects that are in play, and no Transactor server is needed to "change owners". Instead, the game servers maintain a "designated owner," which starts out as the object's original Transactor owner, but may be altered according to the game rules for plundering when another user encounters the object. Since the game server is acting as a broker, the player who brings the object into play must voluntarily transfer ownership to the game server, fully agreeing that the game-play rules determine who will eventually get actual Transactor-certified ownership of the object. If the game design allows objects to be taken out of play, then the most recent "designated owner" receives actual Transactor-certified ownership of the object, and receives the object from the game-as-broker, not from the object's original owner.

Borrowing is a game rule or rules that define how an object may be used by someone other than its owner, and perhaps how ownership of the borrowed object may be transferred without the owner's direct permission should the borrower "lose" the object. As with plundering, the game server acts as a broker and actually owns the object as far as a Transactor server is concerned. Thus, any rules that the game designer makes will be carried out on objects already owned. Also as with plundering, there is a "designated owner" who can take the object out of play and become the "actual owner" (i.e. the Transactor-certified owner). A borrower would typically be prevented from taking the object out of play by the game rules. If this is not done, then there is no difference in fact between a borrower and a plunderer (since possession would equal ownership), and a borrower would simply be a plunderer to whom you gave the object voluntarily rather than involuntarily.

Other games that involve brokering comprise the following:

(1) Sales: More than just a neutral broker, a Sales agent would earn its fee by actively seeking out buyers for the goods it has been charged with selling. Like any broker, it owns the goods it is trying to sell, at least according to an authenticating Transactor server. The "designated owner" is the individual who wants the goods sold, and to whom ownership will revert according to the agreed-upon rules and constraints, should the item not be sold.

(2) Collectors and Searchers: A collector agent would seek out sellers of goods described or designated to it by its users. It would then buy or trade to acquire those goods, according to the instructions it was given by a particular user. A Collector agent may have several users who all want the same object. The arbitration rules for deciding who actually gets an object are for the designer to define. They are not a Transactor law or rule. First-come first-served is one example of such a rule. Highest finder's-fee is another. Bribery might be another. These are all valid Collector rules in the Transactor universe.

(3) Gambling/Gaming: A casino or gambling house acts as a broker for its patrons. It may charge a fee, or it may take a cut of winnings, or any other arrangement. The objects wagered can be private currency or barterable objects, depending on the house rules.

The above rules of brokering can be altered to give different fundamental play experiences. For example, if the "designated owner" concept was eliminated, then all objects brought into play would be in one large pool of unowned objects. A raffle or other gambling situation might then distribute objects based on some game-play rules, or just randomly. In this game, players would be willing to relinquish all ownership claims to an object in the hope of getting some better object brought into play by someone else. The game broker would retain ownership of all unclaimed or unwanted objects. Users would have no expectation of getting any of their own objects back.

Some brokering agreements may ignore the "return on demand" rule, and only return objects to their owners when the brokering agreement expires. Certain commercial operations such as auction houses might need this rule variation, to guarantee to bidders that an object remained "in play" until all bids were in or the brokering agreement expired. This would apply for real-time as well as delayed auctions. These agreements will also probably have a minimum price that the object must be sold for, just as real-world auctions do.

Services, Capabilities and Support Modules

Services, capabilities, and support modules used in an embodiment of a Transactor system according to the present invention are set forth below, along with a description of how these elements interact to produce the desired outcome.

It will be apparent to those skilled in the art, based on the present disclosure, that embodiments of Transactor server and client software may be implemented in many computer languages such as, for example, C/C++ or Java, and that embodiments may be implemented in a manner that is portable across Window/Windows NT and selected UNIX environments.

1. Transactor Elements and Services

A Transactor system according to the present invention can be broken down into several elements and services. The primary division is into client-side elements (termed tools) and server-side elements (termed services). Some elements, such as embedded applets, can be viewed as lying somewhere between these two elements, because they originate from and communicate with a server yet run and operate on a client machine.

A tool is a distinct identifiable program or capability residing on a client's computer. It is invoked directly by a user to accomplish a specific purpose. It is more like a tool in a Word toolbar, rather than like a command-line tool in Unix.

Publicly accessible server-side elements appear simply as services on a network, with no specific requirement that they be implemented as separate server processes on a particular server machine or cluster of machines. A particular service may be provided by a class or thread within a single server program, or by a distinct server process on a machine, or by a group of server machines, or even or by a distributed self-updating service like the Internet's Domain Name System (DNS). As long as the client users and other servers know how to obtain the service, the details of providing it can vary.

In addition to supplying or integrating with Transactor services, a typical Transactor merchant will also need to supply other conventional vendor services as appropriate (e.g., a sales mechanism or metaphor, a stocking mechanism, billing).

2. Transactor Client-Side Tools

Transactor client-side tools, discussed below, reside on and run from the client's machine. Preferably, they are not embedded in web pages. A wide variety of techniques for constructing the below tools will be apparent to those skilled in the art, based on the present disclosure.

(a) Object Manager: The object manager collects objects into lists and groups, examines or browses objects, including unowned ones, etc. This is the "root" Transactor tool from which all other actions (owner acceptance, wrapping, unwrapping, etc.) can be performed.

(b) Owner Acceptor: The owner acceptor accepts a password or pass-phrase typed in, applies it to a Transactor "keychain", and allows use of resulting Transactor keys, if successful. In some embodiments, this tool is implemented as an inherent part of the Object Manager.

(c) Object Trader: The object trader enables an accepted owner to engage in object trading (selling or buying) directly with another Transactor user. In some embodiments, this tool is implemented as an inherent part of the Object Manager.

(d) Wrapper: The wrapper wraps a raw digital object (which may be an existing digital object in the user's possession or a digital object newly created by the user) with an owner's Transactor info, resulting in a Transactor object.

(e) Unwrapper: The unwrapper unwraps an owned object, resulting in a raw digital object and a separate file holding the data from the Transactor fields.

3. Transactor Server-Side Services

These services are provided to both end-user clients as well as to other distributed servers that need intermediate access to the service (i.e. vendor-servers subscribing to the Transactor services). A wide variety of techniques for implementing the below services will be apparent to those skilled in the art, based on the present disclosure.

(a) User Registrar: The user registrar register new users, issuing Transactor ID's (TID's); allows registered users to edit their info; and responds to a Bookkeeper's requests to validate TID's. It does not validate objects or ownership, only the identity of users.

(b) Bookkeeper: The bookkeeper receives, confirms, and logs all transactions and transfers of objects; maintains accounts (distributes splits to other users, etc.); and performs collect-and-forward transactions to other mercantile servers (bank-cards and bank-deposits)

(e) Object Registrar: The object registrar register new objects, issuing Object ID's (OID's);
validates objects and ownership thereof, for Bookkeeper; and performs ownership transfers in support of Bookkeeper 4. Vendor's Server-Side Services In some embodiments, a Transactor vendor will have utilize a Storekeeper service, which keeps an inventory list; keeps a sales log of transactions; and communicates with the User Registrar, Bookkeeper, and Object Registrar.

(a) Transactor Support Modules:

The above tools and services are built upon a common set of support modules. A module should be treated as a related set of facilities or capabilities, not necessarily as a software-design element corresponding to a library, package, or class. The core support modules are:

Database Module

Cryptography/Security Module

Transactor-field Module

Logging Module

Financial Module

Not all client-side tools or networked services will use every support module, but they all use the same module whenever there is a need for shared data. For example, all parts of Transactor use the same cryptography and Transactor-field modules (and the same revision-level thereof); otherwise any exchange would appear as gibberish to one side or the other.

Networking software may be provided either as a standard library (e.g., as for C or C++), or as a standard part of the language system (e.g., as for Java).

(b) Database Module:

All information about transactions, users, objects, etc. is kept in databases. Because some information is very valuable or sensitive, while other information may change at a rapid rate, several actual databases preferably are maintained, rather than a single all-encompassing database.

(c) Cryptography/Security Module:

This module is responsible for encrypting and decrypting all Transactor objects and communications. It is also responsible for generating unique cryptography keys, Transactor ID's, and Object ID's. Finally, it validates a password or pass-phrase entered by a user to gain access to the Transactor "key-chain" file (i.e., it provides client-side key-management functions).

(d) Transactor-Field Module:

This module allows other modules to read or write the Transactor fields of a given object's Transactor wrapper independent of any actual game or other use. This module also performs wrap and unwrap of raw digital objects.

(e) Financial Module:

Using the values from an object's Transactor fields, as received from the Transactor-Field Module, this module computes splits, fees, etc. for all the participants in a sales transaction according to an object's predetermined Revenue Model. This module also distributes those amounts to each user account in the database, and writes entries in the log. This module also interfaces to third-party "bankware" to perform payments and billing of all user accounts. A policy is defined so as to determine when, how often, at what amount, what activity level, etc. to actually initiate a banking transaction involving the bankware.

A Revenue Model is a server-side software element that determines how revenues accrue to Owners, Makers, etc. In some embodiments, it is preferable to define several standard Revenue Models. In some embodiments, a "plug-in" type architecture for additional Revenue Model components is also used.

(f) Logging Module:

A log provides a complete serialized list of every change to any Transactor database. This acts not only as a backup in case of database corruption, but also as an independent accounting audit trail for all transactions. The Logging module maintains several such logs, serving different purposes as outlined in more detail later. Most logging occurs on the server-side, but a client-side Logging Module is responsible for logging a user's transaction history in the local transaction log. This is purely for user information purposes.

Additional Features of Modules

1. The Cryptography/Security Module

Cryptography provides several features within Transactor: data invisibility, data integrity, authentication, etc. Data invisibility means that the data is not visible to any but an authorized user/owner. This is accomplished with encryption. Data integrity means that data can be determined as being in an untampered form. This is accomplished with secure hashing and digital signatures. Authentication means that two parties who do not trust each other can each determine that the other entity is who it claims to be. This is accomplished with authenticating protocols that may employ encryption, hashing, digital signatures, etc.

This module is responsible for encryption and decryption of objects and other data, as well as creation of cryptography keys. A Transactor ID and an Object ID are part of the authentication system and, preferably, are uniquely identifiable and cryptographically secure. User ID's may simply be sequentially assigned numbers, from a pre-determined range allotted to a particular Transactor server. Uniqueness is the only requirement. Object ID's may include a sequentially assigned number, as well as hashed information about the object's contents, maker, registration time, etc. These values are essentially impossible to forge or fake, nor do they allow an altered or forged object or user to be improperly recognized as valid. Since the user and object databases contain every known ID, all objects and users can always be verified.

A Transactor user's data may change over time, such as from a change of address. This does not alter the originally issued Transactor ID. The registered user simply enters the new data, while using the same ID originally calculated and assigned.

A Transactor object does not change over time, so its Object ID (or a related message digest or hash) can always be recalculated to verify that it has not been tampered with. This is how objects can be verified as unaltered even without transferring their entire contents to the Transactor Bookkeeper service.

The fact that objects are, in this sense, immutable once registered does not prevent time-varying properties from accruing to the object. It only prevents that variable property from being verified by the Bookkeeper. For example, a game weapon may have a variable power level, but that variable must be kept outside the "wrapper" provided for Transactor object validation. The weapon itself may define internal constants that limit valid power levels, and these would be inside the wrapper to prevent tampering. Thus, the worst effect from tampering is to gain a full power level.

One variable property that the Bookkeeper does track is existence (e.g. was the object destroyed). Destroyed objects are still kept in the database, but are marked as destroyed (or are moved to a separate "destroyed" database). This makes such objects recognizable but unusable. An administrator may enact a retirement policy that removes the majority of a destroyed object's data after some period of time, to keep database size manageable. As long as Object ID's, message digests, or hashes are retained so an object can be recognized as destroyed, the object's entire original data-package need not be preserved.

2. The Transactor-Field Module

Every Transactor digital object preferably contains several data fields in the object itself that identify the object and its owner, its original creator, the revenue model, and how sales splits are computed. The Transactor registered-object database holds the correct values of all unalterable fields, so any tampered field can be easily identified and set right.

Other Transactor modules use the Transactor-field values to determine how to handle the object, or how to handle transactions involving the object. This module provides uniform access to all readable fields, and constrained but uniform access to writable fields. For example, anyone can read the Current Owner field and retrieve the ID kept there, but only the accepted and verified owner can write to that field. But even the owner can't do everything. An owner can set a new price, but can't change the Maker or Split fields. The latter can only be changed by the original Maker.

3. The Financial Module

The Financial Module acts as the intermediary between Transactor transactions and actual banking or payment-system (bankware) transactions. This module's main purpose is to calculate and distribute the fee splits designated by the object being sold. In the simplest case, this is basically a "calculate and forward" module, and every Transactor transaction immediately results in one or more bankware transactions. Such a simple implementation might not even need to keep any account-balance information of its own, instead relying entirely on the bank-maintained accounts to determine a user's balances.

A more sophisticated Financial Module might instead maintain its own "summary" accounts for every user, and only perform bankware transactions at the end of the day, and only for those accounts whose resulting daily balance was larger than some predefined amount (e.g. more than $2.00 credit or deficit), or had gone longer than 30 days without a transaction. By aggregating the bankware transactions in this way, users and vendors are spared the overhead of large numbers of tiny banking transactions. The detailed transaction logs and the corresponding reporting tools provide a complete audit trail to determine every detail that went into any aggregated banking transaction.

In such a "summary account" system, the user's current account balance is either a positive or negative amount. At the end of each day (or other policy-defined billing period), the current balance is zeroed out, and translated into an appropriate credit deposit or debit charge against the user's designated outside financial accounts. That is, a single bankware transaction occurs. If the amount is small enough, it is simply carried forward to the next billing period and no bankware transactions are performed for that user's account. The precise details of "small enough", as well as other particulars such as a small balance carried for a long enough period of time, will be determined by further research or an arbitrary decision in the design. In any case, these parameters must be tunable.

There are advantages and disadvantages to any particular Financial Module design, anywhere along the continuum between the two possible methods presented above. These benefits and risks must be completely enumerated and analyzed in further Financial Module design. In particular, issues of security,, expected server load, and customer or bank liability will be considered, along with any legal or financial responsibility requirements.

A Revenue Model is a software element that calculates how ownership transfers generate revenue for sellers or makers. A Revenue Model is designated by an ID in the Transactor object itself, designated when the object was created by its maker. The Revenue Model software component is passed information about the object, the sale price, etc. and is responsible for calculating how much of the sale price goes to seller, maker, broker, etc. These values are then returned to the main Financial Module for actual disbursement. Thus, the Revenue Model software component has no knowledge or interaction with accounts, bankware, etc. It only calculates shares in a revenue stream.

The above variations in underlying design should not be interpreted as uncertainty in the Transactor design or bankware interfaces. Rather, they should be treated as available options or modules determined either by the vendor who installs a Transactor system, or as required to support different payment options that may operate under different constraints (e.g., credit-cards, debit-accounts, DigiCash).

4. The Logging Module

Depending on the capabilities of the database selected (for example, Oracle), most data collected and processed by the different Transactor services is kept in redundant form. The primary storage facilities are the various databases. Redundant information is kept by time-stamping and logging every transaction that alters any database. This log acts as both an accounting audit trail and as a backup mechanism.

As an audit trail, the log can be searched (off-line using yet-to-be-defined tools) to discover reasons for problems like, for example, account balance disparities or contested purchases. It also clearly shows the time at which each transaction was made.

As a backup mechanism, the log can be used to restore the databases should they become corrupted. This is accomplished by starting with a valid backup database and sequentially applying every logged alteration. The result is an up-to-date database. In the safest setup, all log files are kept on a different physical hard disk than the database files.

Note that separately implemented logging facilities may be eliminated as redundant, as fault tolerance services of the Oracle database may more easily or simply meet these requirements. However, the logging module is nonetheless described here to illuminate the required functionality.

Rules of Logging

Log-files must always be secured—they hold sensitive or valuable data

Data is only appended to a log-file, never deleted.

Every log-entry is automatically time-stamped with its entry-time into the log.

Every transaction is logged, both valid and invalid ones.

One log entry may correspond to several changes in the databases.

Log-file formats should be compact (i.e. binary, not ASCII text).

Note that even rejected transactions are logged, since they indicate some kind of problem (data loss, theft attempt, etc.). To prevent the log file from growing too large, the Logging Module can switch to another log-file at any time, under administrative direction (manually, at a scheduled time (e.g. midnight), etc.). A log-file switch is performed using the algorithm outlined below. Log entries received during the switch are queued up and eventually written to the new log-file. The logger must never overwrite, truncate, or delete a file itself. If it fails to create a new empty unique log-file, it will refuse to switch log files.

Log-files need not be kept forever. They can be moved off-line after some period of time and retained only until their backup media is reused. The scheduling of this should be one of the policies determined by the Transactor administrators or owners, and implemented as a configuration option of the Transactor software.

Since log-files contain valuable sensitive data, they must be kept secure at all times, even when off-line. Log files may be encrypted to protect against possible snooping. This option must only alter the data written to the log, not any other aspect of its nature.

5. Log-File Switchover

A log may be 'reset' so that log-files do not grow too large. This does not actually delete any data from the log. Instead, the logger switches to a new log-file, leaving the prior log-file intact. Failure at any point aborts the log-switch, and logging continues in the original file, with a log-entry made that a log-switch failed. This switch is accomplished as follows:

0) a memory-based queue is created to hold log-entries received during the switch. Entries are time-stamped with their entry-time into the queue.
1) a new file is created under a temporary name. It will be automatically renamed after a successful log-switch has occurred. Failing file creation, no log-switch occurs, so stop now.
2) On successful file creation, a transfer time-stamp is made. This time-stamp will be used in several following operations.
3) A "transfer entry" is written to the new log file, stamped with the transfer time-stamp.
4) The prior log-file is written with an identical "transfer entry", and the file is flushed to disk.
5) The prior log-file is closed.
6) The prior log-file is renamed by appending the transfer time-stamp to the existing name, in an acceptable ASCII format (i.e. no illegal characters for the machine).
7) The new log-file is renamed to the old log-file's name. Depending on the platform, this may require closing the new log-file, renaming it, then reopening it and seeking to the end.
8) The new log-file is written with a "linkage entry" noting the new name of the prior log-file. This entry is time-stamped with the actual time of log-switch completion, not the earlier transfer time.
9) All queued log-entries are appended to the new log-file.

After completion of the above steps, the old log-file can be moved off-line, or to backup media, or whatever. New log entries will be appended to the new log-file, which starts out with at least two entries: the transfer entry and the linkage entry. Any log-entries received during switchover are also in the new log-file.

Transactions and Transaction Records

A Transactor transaction occurs whenever ownership of an object is transferred from its current owner to a new owner. A transaction record is the collection of data that describes all the entities involved in that transaction and the type of transaction requested. Transaction records can be valid or invalid, solely depending on their contents. A critical Transactor service is to recognize and prohibit all invalid transfers by rejecting invalid transaction records. It is the Bookkeeper that performs this service, with support from the Object and User Registrars.

A transaction record basically looks like this:

Type: Seller sold Buyer this Object on Date for Price, by time X; signed by Seller, then Buyer.

This directly translates into a data representation format:

T: S sold B this O on D for P, by X; signed: SS, BB.

T is the type of transaction record, identifying the rest of the data for the Transactor server. S is the Seller's TID, which must also be the original owner of the object. B is the Buyer's TID, which will be the new owner of the object. O is the transferred object's unique Object ID (OID), or some yet-to-be-determined unforgeable token representing the object itself (e.g. a message digest or secure hash). D is the date and time (expressed in GMT for uniformity) at which the transaction occurred. P is the agreed-upon price, if it was a sale for money as opposed to barter. X is an expiration-time a short time after the transaction record is completed. Its purpose is explained below. The entire transaction record is then digitally signed by the Seller SS, then by the Buyer BB. This collection of data is then sent to the Bookkeeper service for validation and approval. If approved, the given object's ownership is transferred to the buyer, and the new ownership is recorded in the database. If rejected, there is no ownership transfer, but the Bookkeeper retains the record so it can detect patterns of fraud or other difficulties.

The Seller constructs the transaction record and fills in all fields, then signs it. The transaction record is then sent to the Buyer, who decrypts it, verifies the Seller's signature, then signs it, encrypts it again, and sends it to the Bookkeeper service. These last steps requires the Buyer's cooperation, so the Seller must trust the buyer to actually sign and forward the transaction record. Without the expiration-time X, this would be a security flaw, since Seller's are not required to trust Buyer's. Adding an expiration-time declares a deadline after which the transaction record is automatically invalid, so the Seller is no longer entirely dependent on the Buyer's good behavior. The Buyer must submit the transaction record to the Transactor server before this deadline, otherwise it will be rejected, even if all other data is correct. This deadline prevents the Buyer from holding the Seller's object "hostage" for an indeterminate time, effectively preventing its sale or use elsewhere. After the deadline, the Seller can sell the object to someone else without fear that a bogus delayed transaction record will be sent in by an unscrupulous Buyer. A short deadline (say 30 seconds) can be used as the initial time-out, but if network delays cause rejection, this can be automatically increased by some increment up to some reasonable upper limit (say 3 minutes) that both Seller and Buyer agree on first.

Because both the Buyer and the Seller sign the transaction record with their private digital-signatures, neither one can later claim ignorance of the transaction and demand that ownership be restored (i.e. the protocol provides non-repudiation). If either one detects cheating or improper data using its own knowledge, it can simply refuse to sign the transaction record. Both signings are voluntary.

In preferred embodiments, rather than validating individual users or objects, only entire transaction records are validated. If any part of the transaction record is invalid, the entire transaction is rejected and a reason returned. If the complete transaction is validated, then approval is given, and the clients then transfer the data.

When a transaction record is rejected, it can be for various reasons. Invalid ID's for any participant is one reason, invalid signatures is another, and unintelligible data is yet another. Some reasons may be embarrassing for either Buyer or Seller, such as "insufficient funds", so not all reasons for rejection are sent to the clients, only some. A detailed design must list all rejection reasons and which are sent to clients.

When a transaction record is accepted, the Bookkeeper tells the Financial Module to calculate and distribute sales splits, fees, etc. It also updates the object and ownership databases to reflect the resulting object transfer. All intelligible transaction records, whether accepted or rejected, are logged to a transaction log-file. Certain patterns of rejections may send a security notification to an administrator, or take some other predefined action. Garbled transaction-record attempts are not logged to the transaction log, but may append an entry to a "problem with host H" file for later perusal and action by an administrator.

1. Identifying Authentic Objects

The value of O in a transaction record must be something more than just the OID of the object. This is to prevent various fraud schemes whereby having an object's ID would be equivalent to having the object. One way to avoid such problems is to have the O value be a collection or composite of several values that not only identify the object, but also act as an assurance that the object is really in S's possession, and really owned by S. One part of this composite is the OID. The "assurance value" needs to be something that can only be calculated by the object's true owner, such as a message-digest of the object's decrypted contents (only possible for the owner and the Bookkeeper) combined with the values for B and D to introduce unpredictability. Without the unpredictable values of B & D (and perhaps some other random strings), a cheater could have precalculated the object's message-digest, and it would never change even after the object was sold or destroyed. Thus, the main reason for using a message-digest would be lost.

2. Transaction Types

Although entire transaction records are the only thing validated by the Bookkeeper, each transaction record has a type identifier in it, and certain idiomatic patterns of data in the records. Here are some obvious forms, although there are probably more that are useful.

All the following patterns have idiomatic values defined in the transaction record formed as:

T: S sold B this O on D for P, by X; signed: SS, BB.

Only the idiomatic distinctions are pointed out, while all other fields retain their normal meaning. In particular, the D field always contains the date/time of the request, and the contents are always signed by at least one participant. Some fields have no meaning outside of sales transactions, such as the price P, which is zero on all the following.

Verify a User (TID) S is the user making the request. B is the TID being checked. O is all zeros. The record is only signed by SS. An "OK" response means that B is a valid TID. Rejection may mean any error.

Validate an Owned Object S equals B, and is the user making the request. O is the object identifier/digest. The record is only signed by SS. An "OK" response means that the object is valid and is owned by S. Rejection may mean any error.

Validate an Unowned Object S is all zeros. B is the user making the request. O is the object identifier/digest. The record is only signed by BB. An "OK" response means that the object itself is valid, but its ownership is undetermined. This prevents non-owners from inferring another user's owned objects by probing with valid Object ID's. Rejection may mean any error.

Special Object Properties and Situations

The Transactor software system is a flexible general-purpose system for establishing ownership and for conveying products and payments. It is not limited to real-world monetary transactions, nor to purely digital objects. Following are some specialized features that are available, in some embodiments, as options to Transactor service providers.

1. Preview Objects

When an ordinary user is offering an owned object for sale or trade, it is useful for the buyer to examine the on-screen representations of the actual object (i.e. its image or sound) on his own machine. These may be beauty shots or the actual images that are part of the object. It does not include any of the object's behaviors, however.

These previews are one use of a special property that can be given to a Transactor object: the transient property. Transient objects provide a mechanism to allow exchange of data between users or client and server that exploits the security and consistency of the Transactor protocols, while not transferring ownership or utility to the receiver. Transient objects cannot be stored in a user's inventory, and they automatically disappear when the connection with their originator is broken.

To create a previewable object without transferring the entire real object (which could be much larger), the original complete object may contain or refer to a small embedded transient "preview" of itself which can be separately extracted and sent to the prospective buyer. This transient object has no value, is unusable in play, and cannot be traded or retained in the user's inventory. It is purely for examination before purchase. Its Object ID does not exist in any Transactor-server database, since it is created on-the-fly, so it cannot be traded.

Not all Transactor objects must contain previews. The user may already have all the previewable images or elements possible for a game or other scenario (e.g. on the original CD-ROM), and it would suffice for the buyer to know that a Model X41 Laser Pistol was being offered. The software would then load the previewing images or other representations from the buyer's local machine (hard disk or CD-ROM), and no preview object would be needed.

2. Membership Cards

In principle, a membership card is a persistent "entry visa" to other services or privileges. It is persistent in that it cannot be spent or expended like currency, and has no inherent value as currency (but may have collectible value). It allows entry or access to services, because the service provider can see the user present a valid card. Membership cards usually have an expiration date, nor are they transferable to another user except by the issuer. A passport is one example of a "membership card", as is a driver's license.

A membership card also identifies the holder as a member of the issuing organization, but this is primarily for use by other organizations, since in an electronic world an organization may be presumed to have an available database of members, making membership cards superfluous. As a real-world example, membership cards may be used across organizations, such as showing a specific airline's frequent-flyer card to receive a discount at a particular car-rental agency. The car-rental agency can't redeem miles, but can give a discount after seeing a valid card. Thus possession of the card has value, even if not as currency.

Membership cards are one application of a special property of Transactor objects: the assigned property. An assigned object is owned like any other Transactor object, but its ownership cannot be changed by the owner, only by the maker/issuer. Specifically, the assigned object cannot be sold or traded away until after it expires (thus not interfering with any potential collectibles market). If the issuer creates the object with an expiration date, then the object is only valid until that date.

All assigned objects contain the normal Transactor fields identifying the owner, maker, etc. But since these fields are inherently alterable, the assigned object must have an override mechanism. That override is contained in the digitally-signed and inherently unalterable body of the object. It consists of an additional packet of data labeled as "assignment data" and appearing in a standardized form, which contains the TID of the issuing organization, the TID of the assigned owner, and an assignment expiration date. These unalterable fields automatically override the normal Transactor fields, and thus prevent the object from being traded away or transferred. Since the issuer and assignee TID's are visible, the user's membership in that particular issuing organization is confirmed to any third party who requests a membership card.

The assignment data packet may also hold an expiration date. When used beyond that date, the object is no longer valid, and should be treated as if the object did not exist. For the case of membership cards, this represents the membership expiration date. For other kinds of assigned objects, it may represent a deadline or some other fixed date or timestamp, as defined by that kind of object's unique requirements.

Membership cards may be defined by the issuer/maker to hold preferences or other demographic data about the assigned owner. This data may be encrypted, visible only to the issuer, or it may be cleartext, visible to any organization that the card is presented to. In the real world, for example, driver's licenses are effectively membership cards. A "motorcycle" endorsement or "corrective lenses" restriction are owner-specific information encoded on the card itself.

3. Private Currencies

A private currency is any fungible valuable medium of exchange that does not represent actual money. The term fungible means that the nature of the object makes it replaceable and non-unique, such as grain or cash is in the real world. The term valuable simply means that people might have a reason to collect pieces of the exchange medium, other than as collector's items. So private currencies do have real value, even if not directly convertible to cash. Some real-world examples are frequent-flyer miles that accrue and earn airline tickets or hotel stays, or the "bonus points" awarded by some long-distance phone carriers that can be redeemed for phone-time or merchandise. But perhaps the best-known example is S&H green stamps—they are fungible and valuable, but have no actual cash value.

When a Transactor system is installed, its medium of exchange is defined as either money or a private currency. If the private currency option is chosen, then a CurrencyConversion supporting module is configured and installed in the system. This module converts private currency amounts into money amounts, as needed by other modules in the system (e.g. the billing department). The actual conversion data is defined in a vendor-specific database, which is kept secure on the vendor's servers, and can be edited by the vendor at any time.

A private-currency Transactor system requires conversion into and out of the private currency. Conversion into private currency is made as a money-purchase of some number of units of the private currency. For example, a user spends $10 and has 1000 quatloos credited to his account. This can be a straight linear conversion, or it can be tiered (e.g. spend $20 and get 2500 quatloos), all as defined in the conversion database.

Normal spending of the private currency is simply a "redemption" of the private currency in exchange for an object. This needs no conversion, only the price of the object expressed in the private currency, e.g. 200 quatloos to purchase a new laser-pistol digital object. The buyer's account is debited and the object is transferred to the new owner. If the seller were another user, then the seller's account would be credited. Nowhere is a conversion out of the private currency required. Note that this is true even when physical objects are being purchased (e.g. the example of S&H green stamps did not require cash, either).

Conversions out of the private currency only occur when outside organizations are involved. For example, if a phone company were offering conversion of quatloos at 50 per minute of long-distance time, then a conversion would need to be performed. This information is contained in the database, and identifies not only the conversion rate, but the identity of the offerer (phone company), the expiration date of the offer, and any other limits on conversion (not more than 5000 quatloos per individual). All this data is used to perform an outside transaction, according to the protocols for physical objects (described next).

Purchasing Physical Objects

Physical objects can be bought and sold on a Transactor system, in addition to or as an alternative to purely digital objects. For example, a user can buy a T-shirt or a game accessory as easily as a new digital game object. The user immediately receives an assigned digital object representing the purchase of the physical object, and later receives the actual physical object via a shipping channel. Any conventional shipping channel may be used for this purpose.

The purchase of physical objects requires an interface between the Transactor server and a merchandise supplier. This is similar in concept to the interface between the Transactor server and financial institutions, and is accomplished using identical supporting software and interfaces; that is, the merchandise supplier appears to the system as just another outside organization providing "financial" services. The only difference is that the middleware deals in merchandise orders rather than in monetary transfers. Both types of transactions involve transfer of value, account reconciling, security aspects, etc.

When a user purchases a physical object, his account is debited in the normal way. A new digital object is created and transferred to the user. This digital object represents the merchandise order, and contains all the information one would find on a regular order receipt: date of order, price, tracking number, buyer, seller, shipper, shipping address, etc. Thus, the digital object serves as a digital receipt. The digital object, however, can also contain other elements, such as beauty shots of the purchased physical object (e.g. JPEG images), preferably rendered to match any optional features, like color or size. This digital object is an assigned object having no intrinsic value (described above, under "Membership Cards"). Since it is assigned only to the buyer, it cannot be traded away, although it can be deleted from the owner's inventory at any time, if desired.

When the user's account is debited, an order is placed with the merchandise supplier, as if that supplier were being "credited" with the amount deducted from the user. In reality, the "credit transaction" is an order for the merchandise, incorporating all the shipping information and other account information needed to process the order. At that point, it is the supplier's responsibility to ship the order to the user, and the Transactor system is not involved any further.

This protocol for purchasing physical objects works for any Transactor-supported sales mechanism, including direct object sales as well as flyers. The flyer for a physical object is no different than that for a digital object, since both actually refer to a service provided by a supplier, as outlined above.

Cryptographic Protocols

A variety of cryptographic protocols to provide security for the above-described Transactor system and other Transactor systems according to the present invention will be apparent to those skilled in the art based on the present disclosure. This section presents a preferred set of mechanisms and protocols used to provide security in connection with the Transactor system discussed above. These security features are discussed in the context of, and are particularly useful in embodiments, involving interactive games which may allow ownership and transfer of various kinds of objects, both online and offline.

In the game setting, objects are typically owned by players (in some cases, they may be simply lying discarded somewhere, owned by no player, in which case ownership may be assigned to the game server). An object is not necessarily represented by an "object" in some programming language (though this would be a natural way to represent it). Game objects are usually owned by someone, and have specific attributes, which may change over time.

In some game embodiments, objects are owned by independent agents acting in the game world. This can be considered to be a form of ownership by the game server. In the worldview of the players, however, the objects will be owned by another entity.

Objects and Cheating

It is desirable to resist several kinds of cheating, which include a. Unauthorized creation—Most objects cannot be created by players.

b. Unauthorized transfer—Some objects can only be transferred under special conditions.

c. Unauthorized destruction—Most objects cannot be destroyed by players, or can only be destroyed under special conditions.

d. Impermissible multiple transfers—A player may try to transfer the same object sequentially to many other players, which is inappropriate for most objects as a previously transferred object is no longer in the first player's possession.

e. Queries—A player may try to determine what objects are in the possession of other players, or those objects' attributes.

f. Unwanted Transfer—A player may try to transfer an object to or from another player, without that player's approval.

g. Resurrection—A player may try to bring back an object that has been destroyed.

h. Alteration—A player may try to alter the attributes of an object, i.e. increasing the number of charges some magic item has.

i. Multiple Play—A player may try to play in many different games (in any mode but Server-Mode), and use the same objects in each. This is an extension of the idea of multiple transfers.

The following protocols and data structures allow the Transactor system to resist unauthorized creation, queries, and unwanted transfers at all times. All the other attacks can be resisted in real-time only in Server-Mode, and otherwise will allow the cheating to be caught later.

Notation

In this section, several protocols are described using the following simple notation.

a. Encryption using a symmetric algorithm, such as DES, 3DES, or RC4, is shown as E_{Key}(Data), where Key is the key and Data is the data being encrypted.

b. Hashing using a one-way hash function, such as MD5 or SHA1, is shown as hash(Data).

c. Public-key signing using an algorithm such as RSA, DSA, or ElGamal, is shown as Sign_{PrivateKey}(Data), where PrivateKey is the signer's private key, and Data is the data being signed.

d. Public-key encryption, using an algorithm such as RSA or ElGamal, is shown as PKE_{PublicKey}(Data), where PublicKey is the public key of the message's intended recipient, and Data is the data being encrypted. Typically, this is used only to send random encryption keys for symmetric algorithms.

e. All protocol steps start with a header value, labeled something like
U1=hash("Transactor System—Exit Visa Request").

This is used to ensure that both the sender and the receiver always can immediately tell which message of which protocol they have received. These can be precomputed and stored in the source code as constants, or the actual text string can be used to calculate this at run time.

f. Many protocols require some random numbers or keys. These are assumed to be coming from a high-quality cryptographic random bit generator. Good cryptographic libraries, such as BSAFE, RSAREF, and CryptoLib, have good software routines for starting with a random seed value too unpredictable to be guessed, and using it to derive a long sequence of unpredicatable values. Typically, the problem is in getting a sufficiently random initial seed. Methods to do this are described in the last part of this section. A variety of protocols and algorithms are known to those skilled in the art (see, Scheier, Applied Cryptography, 2nd Edition (John Wiley & Sons, 1996)) and, based on the present disclosure, may be used in connection with embodiments of the present invention.

Implementation of the Protocols

Each protocol message has a unique 160-bit identifier at its beginning, followed by a 32-bit version identifier, and a 32-bit value giving the length of the whole final message. This is intended to allow an implementation to parse each incoming message immediately.

Preferably, there is one universally-accepted message:

U0=hash("Transactor System—Error Message")

V0=version

L0=total message length

Ux=the header of the previous message

C0=error code

L0a=Length of freeform error recovery data (may be zero).

D0=freeform error recovery data

X0=U0,V0,L0,hash(prev message *),C0,L0a,D0

* When there is no previous message, this is an all-zero field.

The total message is

M0=X0,Sign_{SK_{Sender}}(X0).

As stated below, all lengths are given in bits (to accommodate odd lengths of key or data), but all fields are padded out with zeros to the next full byte boundary.

The above described bit fields are examples only. Other embodiments having different bit fields and protocol implementations will be apparent to those skilled in the art based on the present disclosure.

Programming Models

A variety of interactive game design approaches for use in connection with a Transactor system will be apparent to those skilled in the art based on the present disclosure. In some embodiments, there is one central server, which holds the "world," and with which all players' machines interact to learn about and influence their world. This is an inherently simple way of implementing a game. It suffers from the problems that it may be hard to find a trusted server machine which has the computational ability and bandwidth to and from each player's machine to do this effectively. Essentially, this is related to centrally maintaining one big database with various kinds of access restrictions. The security model described below is most effective in connection with this type of game setting.

Modes of Play

This security system relates to the following four basic modes of play:

(1) Server-Mode: The most secure design for all of the security issues is simply to have each player interacting constantly with the server. The server can always arbitrate in disputes.

(2) Proxy-Mode: Some other entity is acting as proxy for the server. This would typically be the case when a small group of users wanted to play a "local" game. The proxy will prevent unwarranted creation, destruction, and alteration of objects in the local game, and will try to guarantee that no cheating done in the local game (even involving all participants) can allow cheating in the global game. Note that in many circumstances, one player in a group might be trusted enough to be the proxy.

(3) Group-Mode: A small group of players is interacting without even a proxy server. In this case, the group themselves must probably take on the proxy server's tasks, probably by delegating one of their machines to server as the proxy server.

(4) Player-Mode: In Player Mode, there is a single player playing the game alone. His machine is effectively the proxy server.

In any of these modes, objects may be transferred around between players, and may also (in some cases) be discarded or picked up. It may make sense to have a user ID for a player called "nobody," and have this user ID possess things that have been discarded. There may be one such user ID used for each different game or "world" that's going on, i.e. each Proxy Server may have its own.

Server-Mode

In Server-Mode, security concerns almost disappear. Presenting users with signed versions of their ownership certificates is unimportant, as is verifying those signatures; instead, the server keeps track of everything. This mode needs only two protocols—the one for preparing to leave this mode for some other mode, and the one for coming back to this mode from some other mode. Here, we also discuss the format of object ownership documents and object transfer documents.

1. Ownership Documents

An ownership document is a signed document from the server, affirming that at some time, T, a given player was in possession of a given object, with a given set of attributes and conditions.

Thus, it is structured as:

| field name | | bits |
|---|---|---|
| a. | hash ("Transaction System--Ownership Document" | 160 |
| b. | Version | 32 |
| c. | length of document | 32 |
| d. | Player ID | 64 |
| e. | Player Public Key | 1024–2048 |
| f. | Object ID | 64 |
| g. | Object Data and Attributes | variable*, ** |
| h. | Attribute Transfer Condition | variable* |
| i. | Time at which this document was made. | 32 |
| j. | Time at which this document expires. | 32 |
| k. | Signature on fields a . . . j. | 1024–2048 |

*Variable-length fields always start with a 32-bit length identifier. All lengths are given in bits, but all fields are continued out to the next full byte. If the length field is zero, then that's all the data in that field.
**Object Data and Attributes may change after this document is issued in some cases, i.e., a gun with a limited number of bullets. Implementations need to be flexible enough to allow this, while doing some object-type specific tests to ensure that (for example) the magic lamp hasn't wound up with more wishes than it started with.

A variety of different implementations and structures for ownership documents used in connection with embodiments of a Transactor system will be apparent to those skilled in the art based on the present disclosure.

2. Exit Protocol

The player wants to be able to play at some other mode. Therefore, he requests an "exit visa" from the central server, to allow him to take part in other games. This works as follows:

a. The Player forms
   U0=hash("Transactor System—Exit Visa Request")
   V0=version
   L0=length of final message, including signature.
   R0=a random number of 64 bits
   X0=U0,V0,L0,R0
   and sends to the Server
   M0=X0,Sign_{SK_P}(X0)

b. The Server forms
   U1=hash("Transactor System—Challenge for Exit Visa Request")
   V1=version
   L1=length of final message, including signature.
   R1=a random number of 64 bits
   X1=U1,V1,L1,hash(M0),R1
   and sends to the Player
   M1=X1,Sign_{SK_S}(X1).

c. The Player forms
   U2=hash("Transactor System—Response for Exit Visa Request")
   V2=version
   L2=length of whole final message, including signature.
   X2=U2,V2,L2,hash(M1)
   and sends to the Server
   M2=X2,Sign_{SK_P}(X2).

d. The Server forms
U3=hash("Transactor System—Exit Visa Transmission")
U3a=hash("Transactor System—Exit Visa")
V3=version
L3=length of whole message, including signature.
L3a=length of whole ExitVisa, including signature.
SO[1 . . . n], where SO[i]=signed object ownership statement for object i, and n=the number of objects owned by the user.
TS=valid time span
C_P=certificate of P's public key
R3=a random number of 64 bits
K3=a random encryption key
X3=U3a,V3,L3a,hash(M2),R3,C_P,TS,SO[1 . . . n]
ExitVisa=X3,Sign_{SK_S}(X3)
and sends to the Player
M3=U3,V3,L3,PKE_{PK_P}(K3),E_{K3}(ExitVisa)
3. Entrance Protocol
a. The Player forms
U0=hash("Transactor System—Entrance Visa Request")
V0=version
L0=length of whole final message, including signature
R0=a random number of 64 bits
X0=U0,V0,L0,R0
and sends to the Server
M0=X0,Sign_{SK_P}(X0)
b. The Server forms
U1=hash("Transactor System—Entrance Visa Challenge")
V1=version
L1=length of whole final message, including signature.
R0=a random number of 64 bits
X1=U1,V1,L1,hash(M0),R1
and sends to the Player
M1=X1,Sign_{SK_S}(X1)
c. The Player forms
U2=hash("Transactor System—Entrance Visa Transmission")
U2a=hash("Transactor System—Entrance Visa")
V2=version
L2=length of whole signed and encrypted message
L2a=length of EntranceVisa
ProxyExitVisa=the exit visa from the proxy server or the central server.
K2=a random encryption key
X2=U2a,V2,L2a,hash(M1),ProxyExitVisa
EntranceVisa=X2,Sign(X2)
and sends to the Server
M2=U2,V2,L2,PKE_{PK_S}(K2),E_{K2}(EntranceVisa)
d. After this message has been decrypted and verified, the Server checks to see if any of the changes are in contradiction with other things (restrictions on objects, existing ownership records, etc.). If not, then the Server forms
U3=hash("Transactor System—Entrance Visa Acknowledgment")
V3=version
L3=final length of M3
MESSAGE=any message that needs to be sent to the Player. (This could be encrypted if necessary.)
X3=U3,V3,L3,hash(M2),MESSAGE
and sends back to the Player
M3=X3,Sign_{SK_S}(X3)

Proxy-Mode

Proxy-Mode is also relatively easy to secure. The Proxy takes on the tasks of the Server—so long as these are done honestly, the whole system should work almost exactly like Server-Mode. However, if the Proxy is dishonest, then its dishonesty (at least in changing around object ownerships) should be easily detected.

1. Transfer Documents in Proxy-Mode

In this mode, transfers without revealing objects' histories directly to the receiving users are allowed. This prevents our system revealing things which players might want to keep secret. (For example, if Alice really hates Bob, she may not want to trade with Carol, if she knows that Carol is also trading with Bob. In the real world, objects usually don't know their previous owners.)

In Proxy-Mode, the Proxy Server issues transfer documents. These are of the following general format:

a. hash("Transactor System—Transfer Document")
b. Version
c. Length of whole transfer document, including signature
d. FromPlayerID—ID of the player from whom object was transferred.
e. ToPlayerID—ID of the player to whom the object was transferred.
f. Proxy Server ID and Certificate.
g. Object ID
h. Object Data and Attributes
i. Conditions on Transfers
j. Time of Transfer
k. Time this Document Expires
l. AuditTrail, as discussed below.
m. Sign_{SK_{ProxyServer}}(Fields a . . . l).

2. AuditTrails

Audit trails to ensure that the Server can untangle fraud or errors in object transfers can be implemented in this mode. An audit trail contains the previous transfer document, encrypted under the server's public key. This document will get larger for each transfer, which will leak information about this object's past. This limited information leakage does not present a problem, however, in many embodiments.

The structure of an AuditTrail is:

a. U0=hash("Transactor System—AuditTrail (Proxy)")
b. version
c. length of whole AuditTrail.
d. PKE_{PK_S}(K0), where K0 is a random encryption key.
e. E_{K0}(Previous Transfer Document)

Note that if there is no previous transfer document, we simply set the length field here to 224, which makes it clear that there's nothing that follows this field.

3. Entrance Protocol

Entrance into the game being run by the proxy server occurs as follows:

a. The Player forms
U0=hash("Transactor System—Entry Request (Proxy)")
V0=version
L0=length of whole final message, including signature
R0=a random number of 64 bits
C_P=certificate of player's public key, from ExitVisa.
X0=U0,V0,L0,R0,C_P and sends to the Proxy Server
M0=X0,Sign_{SK_P}(X0)
b. The Proxy Server verifies the certificate and signature, and then forms
U1=hash("Transactor System—Entry Challenge (Proxy)")
V1=version
L1=length of whole final message, including signature.
R1=a random number of 64 bits
C_Q =certificate of the proxy server's public key, given by the central server.
X1=U1,V1,L1,hash(M0),R1,C_S
and sends to the Player
M1=X1,Sign_{SK_Q}(X1).
c. The Player forms
U2=hash("Transactor System—Entry Response Envelope (Proxy)")
U2a=hash("Transactor System—Entry Response (Proxy)")
V2=version
L2=final length of M2
L2a=final length of Y2
K2=a random encryption key
R2=a random number of 64 bits
ExitVisa=the Exit Visa given by the central server earlier.
X2=U2a,V2,L2a,hash(M1),R2,ExitVisa
Y2=X2,Sign_{SK_P}(X2)
and sends to the Proxy Server
M2=U2,V2,L2,PKE_{PK_Q}(K2),E_{K2}(Y2).
d. The Proxy Server forms
U3=hash("Transactor System—Entry Acceptance Envelope (Proxy)")
U3a=hash("Transactor System—Entry Acceptance (Proxy)")
V3=version
L3=final length of M3
L3a=final length of Y3
PlayerData=Data needed by the player to join the game.
X3=U3a,V3,L3a,hash(M2),PlayerData
Y3=X3,Sign_{SK_Q}(X3)
K3=a random encryption key
and sends to the Player
M3=U3,V3,L3,PKE_{PK_P}(K3),E_{K3}(Y3).
e. The Proxy makes some kind of note to tell the central Server that the Player joined the game at this time. When this is delivered, the central Server is able to detect various kinds of cheating. To form this note (whose method of delivery is still unspecified), the Proxy forms
U4=hash("Transactor System—Entry Acceptance Note (Proxy)")
V4=version
L4=final length of M4
ID_P=ID of player
T=timestamp
X4=U4,V4,L4,ID_P,T,hash(ExitVisa)
and sends to the central Server
M4=X4,Sign_{SK_Q}(X4).

4. Exit Protocol

Exit from the game being run by the proxy server is relatively simple. The transfers have all been sent, and the Proxy Server knows enough to form the messages needed to convince the Server that things are on the level.

a. The Player forms
U0=hash("Transactor System—Exit Visa Request (Proxy)")
R0=a random number of 64 bits
V0=version
L0=final length of M0
X0=U0,V0,L0,R0
and sends to the Proxy
M0=X0,Sign_{SK_P}(X0).
b. The Proxy forms
U1=hash("Transactor System—Exit Visa Challenge (Proxy)")
R1=a random number of 64 bits
V1=version
L1=final length of M1
X1=U1,V1,L1,hash(M0),R1
and sends to the Player
M1=X1,Sign_{SK_Q}(X1).
c. The Player forms
U2=hash("Transactor System—Exit Visa Response (Proxy)")
V2=version
L2=final length of M2
X2=U2,V2,L2,hash(M1)
and sends to the Proxy
M2=X2,Sign_{SK_P}(X2).
d. The Proxy forms
U3=hash("Transactor System—Exit Visa Response Envelope (Proxy)")
U3a=hash("Transactor System—Exit Visa Response (Proxy)")
V3=version
L3=final length of M3
L3a=final length of Y3
TO[1 . . . n] transfer chains for all n objects the Player has transferred.
ExitVisa=the ExitVisa issued to this Player by the central Server.
X3=U3a,V3,L3a,hash(M2),ExitVisa,TO[1 . . . n]
ProxyExitVisa=X3,Sign_{SK_Q}(X3)
K3=a random encryption key
K4=a random encryption key
and sends to the Player
M3=U3,V3,L3,PKE_{PK_P}(K3),E_{K3}(ProxyExitVisa),
and sends to the central Server (possibly through a slower channel)
M3a=U3,V3,L3,PKE_{PK_S}(K4),E_{K4}(ProxyExitVisa).

In step d, it is not a security problem if K3=K4-the protocol is specified this way to allow implementations where it would be harder to use the same key for both messages. Also note that if K3=K4, it is very important that proper padding schemes be used in some public key schemes, such as RSA, to avoid various kinds of problems.

5. Transfer of Object

Transference of an object during play is simple: In the following, Alice is the player that starts out owning the object, and Bob is the player that ends up owning the object.

a. Alice forms
U0=hash("Transactor System—Transfer Request Envelope (Proxy)")
U0a =hash("Transactor System—Transfer Request (Proxy)")
V0=version
L0=final length of M0 including encryption.
L0a =final length of Y0
ID_B=Bob's ID
R0=a random number of 64 bits
ObjectDocument=the current object ownership document X0=U0a,V0,L0a,R0,ID_B,ObjectDocument
Y0=X0,Sign_{SK_A}(X0)
K0=a random encryption key
and sends to the Proxy
M0=U0,V0,L0,PKE_{PK_Q}(K0),E_{K0}(Y0).

b. The Proxy decrypts and verifies the message. If all is well, it forms
U1=hash("Transactor System—Transfer Challenge 1 Envelope (Proxy)")
U1a=hash("Transactor System—Transfer Challenge 1 (Proxy)")
V1=version
L1=final length of M1
L1a=final length of Y1
R1=a random number of 64 bits
Description=A description of the requested transfer, including descriptions of the object and any changes or costs from the Proxy Server.
X1=U1a,V1,L1a,R1,Description
Y1=X1,Sign_{SK_Q}(X1)
K1=a random encryption key
and sends to Bob
M1=U1,V1,L1,PKE_{PK_B}(K1),E_{K1}(Y1).

c. Bob decrypts and verifies the message. If he doesn't want to allow the transfer, he can send any message that isn't the expected response, and the transfer will fail. If he does want to allow the transfer, then he forms
U2=hash("Transactor System—Transfer Response 1 (Proxy)")
V2=version
L2=final length of M2
R2=a random number of 64 bits
X2=U2,V2,L2,hash(M1),R2
and sends to the Proxy Server
M2=X2,Sign_{SK_B}(X2).

d. The Proxy verifies this message. If all is well, then it next forms
U3=hash("Transactor System—Transfer Challenge 2 (Proxy)")
L3=final length of M3
V3=version
R3=a random number of 64 bits
X3=U3,V3,L3,hash(M0),R3
and sends to Alice
M3=X3,Sign_{SK_Q}(X3).

e. Alice verifies this message. If all is well, she then forms
U4=hash("Transactor System—Transfer Response 2 (Proxy)")
L4=final length of M4
V4=version
X4=U4,V4,L4,hash(M3)
and sends to the Proxy
M4=X4,Sign_{SK_A}(X4).

f. The Proxy verifies this message. If all is well, it then forms
U5=hash("Transactor System—Transfer Notification Envelope (Proxy)")
U5a=hash("Transactor System—Transfer Notification (Proxy)")
V5=version
L5=final length of M5
L5a=final length of Y5
TransferDocument=a transfer document, as described above.
X5=U5a,V5 ,L5 a,hash(M2),TransferDocument
Y5=X5,Sign_{SK_Q}(X5)

K5=a random encryption key
and sends to Bob
M5=U5,V5,L5,PKE_{PK_B}(K5),E_{K5}(Y5).

Group-Mode

In Group-Mode, a group of two or more players get together without a mutually trusted server. This makes the protocols much harder to make resistant to various kinds of cheating. The preferred solution is to designate one of the players' machines as the Proxy Server, and implement the proxy mode security system described above.

Player-Mode

In Player-Mode, the Player controls his own computer. There are many opportunities for cheating here, but none of them should involve transfer of objects between this Player and others.

A wide variety of error message formats in all these protocols will be apparent to those skilled in the art based on the present disclosure. A simple set of exemplary error codes are set forth below.

| Error Code | Meaning |
| --- | --- |
| 0x00000000 | No Error -- Generally Not Used |
| 0x00000001 | Ownership document version invalid |
| 0x00000002 | Ownership document structure invalid |
| 0x00000003 | Ownership document signature invalid |
| 0x00000004 | Ownership document time range invalid |
| 0x00000005 | Ownership document length field invalid |
| 0x00000006 | Ownership document -- miscellaneous error |
| 0x00000007 | Message length invalid |
| 0x00000008 | Message version invalid |
| 0x00000009 | Message signature invalid |
| 0x0000000a | Message hash chain invalid |
| 0x0000000b | Message header invalid |
| 0x0000000c | Message not decrypted successfully |
| 0x0000000d | Message format invalid |
| 0x0000000e | Message out of sequence |
| 0x0000000f | Message -- miscellaneous error |
| 0x00000011 | Wrapped message length invalid |
| 0x00000012 | Wrapped message version invalid |
| 0x00000013 | Wrapped message signature invalid |
| 0x00000014 | Wrapped message hash chain invalid |
| 0x00000015 | Wrapped message header invalid |
| 0x00000016 | Wrapped message not decrypted successfully |
| 0x00000017 | Wrapped message format invalid |
| 0x00000018 | Wrapped message out of sequence |
| 0x00000019 | Wrapped message - -miscellaneous error |
| 0x0000001a | Certificate signature invalid |
| 0x0000001b | Certificate expired |
| 0x0000001c | Certificate format invalid |
| 0x0000001d | Certificate - -miscellaneous error |
| 0x0000001e | Transfer Document version invalid |
| 0x0000001f | Transfer Document length invalid |
| 0x00000020 | Transfer Document ID invalid |
| 0x00000021 | Transfer Document Proxy Server ID invalid |
| 0x00000022 | Transfer Document Object ID invalid |
| 0x00000023 | Transfer Document Object Data/Attributes invalid |
| 0x00000024 | Transfer Document Conditions on Transfers invalid |
| 0x00000025 | Transfer Document Time of Transfer Invalid |
| 0x00000026 | Transfer Document Expired |
| 0x00000027 | Transfer Document Signature Invalid |
| 0x00000028 | Transfer Document -- Miscellaneous Error |
| 0x00000029 | Player ID invalid |
| 0x0060002a | Object ID invalid |
| 0x0000002b | Miscellaneous error |
| 0x0000002c | Internal error |

The present invention is defined by the claims. The above description of preferred embodiments illustrates certain representative implementations and applications of the present invention, and does not limit the scope of the invention itself.

What is claimed is:

1. A digital object ownership system, comprising:

a plurality of user terminals, each of said user terminals being accessible by at least one individual user;

at least one central computer system, said central computer system being capable of communicating with each of said user terminals;

a plurality of digital objects, each of said digital objects having a unique object identification code, each of said digital objects being assigned to an owner, said digital objects being persistent such that each of said digital objects is accessible by a particular user both when said user's terminal is in communications with said central computer system and also when said terminal is not in communication with said central computer system, said object having utility in connection with communication over a network, said utility requiring the presence of the object identification code and proof of ownership;

wherein said objects are transferable among users; and wherein an object that is transferred is assigned to the new owner.

2. The digital object ownership system of claim 1, wherein said central computer system comprises a central server and an ownership database identifying an owner associated with each of the digital objects.

3. The digital object ownership system of claim 2, wherein said central computer system further comprises a plurality of peripheral servers, each of said peripheral servers being capable of communicating with a plurality of said user terminals and with said central server.

4. The digital object ownership system of claim 1, wherein said central computer system issues an ownership certificate to the owner of an object.

5. The digital object ownership system of claim 4, wherein the ownership certificate comprises a cryptographically signed data structure, said data structure comprising an object identification code, a user code associated with the owner of the object, a key associated with the central computer system, an ownership certificate issuance date, and an object expiration date.

6. The digital object ownership system of claim 4, wherein said central computer system maintains at least one certificate revocation list identifying ownership certificates that are no longer valid.

7. The digital object ownership system of claim 4, wherein objects are transferable among owners.

8. The digital object ownership system of claim 7, wherein objects are transferable online.

9. The digital object ownership system of claim 7, wherein objects are transferable offline.

10. The digital object ownership system of claim 9, wherein a transfer certificate is created when an object is transferred offline, said transfer certificate comprising the ownership certificate of the object, a code identifying the new owner of the object, and the date of the transfer.

11. The digital object ownership system of claim 10, wherein the transfer certificates are cryptographically signed by the owner designated in the ownership certificate.

12. The digital object ownership system of claim 7, wherein objects are transferable in exchange for payment.

13. The digital object ownership system of claim 12, wherein said payment comprises negotiable currency.

14. The digital object ownership system of claim 1, wherein each object comprises at least one immutable attribute and a plurality of replicable attributes.

15. The digital object ownership system of claim 1, wherein each object is assigned a duration.

16. The digital object ownership system of claim 1, wherein said users interact over said network in a virtual world.

17. A digital object ownership server system for conducting interactions with a plurality of users over a computer network, said interactions involving objects owned by at least one user, ownership of said objects being transferable among users, said digital object ownership system comprising:

a user registrar, said user registrar issuing user identification codes to each of said at least one users;

an object registrar, said object registrar issuing object identification codes associated with each of said objects;

a bookkeeper, said bookkeeper associating each object with an owner, and validating ownership of said objects prior to use;

wherein said system issues an ownership certificate to the owner of an object; and wherein said system maintains at least one certificate revocation list identifying ownership certificates that are no longer valid.

18. The digital object ownership server system of claim 17, wherein said server system is a dedicated application server.

19. The digital object ownership server system of claim 17, further comprising an ownership database system, said ownership database system storing codes associated with each object, codes associated with each user, and identifying at least one user as the owner of each object.

20. The digital object ownership server system of claim 17, wherein the ownership certificate comprises a cryptographically signed data structure, said data structure comprising an object identification code, a user code associated with the user that owns the object, a key associated with the server system, an ownership certificate issuance date, and an object expiration date.

21. The digital object ownership system of claim 17, wherein objects are transferable among owners offline.

22. The digital object ownership server system of claim 21, wherein a transfer certificate is created when an object is transferred offline, said transfer certificate comprising the ownership certificate of the object, a code identifying the new owner of the object, and the date of the transfer.

23. The digital object ownership server system of claim 22, wherein the transfer certificates are cryptographically signed by the owner designated in the ownership certificate.

24. The digital object ownership server system of claim 17, wherein said system comprises a central server and a plurality of game servers, each game server being capable of communicating with a plurality of game players and with said central server.

* * * * *

UNITED STATES PATENT AND TRADEMARK OFFICE
CERTIFICATE OF CORRECTION

PATENT NO : 6,119,229
DATED : September 12, 2000
INVENTOR(S) : Martinez et al.

It is certified that error appears in the above-identified patent and that said Letters Patent are hereby corrected as shown below:

Front Page, [73] Assignee:, replace "Transactor Networks, San Francisco, Calif."

with - - The Brodia Group, San Francisco, Calif.- -.

Signed and Sealed this

Twenty-fourth Day of April, 2001

Attest:

NICHOLAS P. GODICI

Attesting Officer

Acting Director of the United States Patent and Trademark Office